United States Patent
Rønnekleiv et al.

(10) Patent No.: US 7,539,080 B2
(45) Date of Patent: May 26, 2009

(54) GRATING DESIGN FOR USE IN A SEISMIC SENSING SYSTEM

(75) Inventors: Erlend Rønnekleiv, Trondheim (NO); Ole Henrik Waagaard, Trondhelm (NO); Hilde Nakstad, Trondheim (NO); Arne Berg, Kattern (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 11/932,246

(22) Filed: Oct. 31, 2007

(65) Prior Publication Data

US 2008/0112261 A1    May 15, 2008

Related U.S. Application Data

(63) Continuation of application No. 11/381,880, filed on May 5, 2006, now Pat. No. 7,366,055.

(51) Int. Cl.
*G01V 1/38* (2006.01)
(52) U.S. Cl. .............................. 367/64; 367/15; 367/20
(58) Field of Classification Search .................. 367/15, 367/20, 64; 181/110, 112, 120; 356/345
See application file for complete search history.

(56) References Cited

U.S. PATENT DOCUMENTS

| | | | | |
|---|---|---|---|---|
| 6,072,567 A * | 6/2000 | Sapack | ........................ | 356/32 |
| 6,195,162 B1 * | 2/2001 | Varnham et al. | ............ | 356/478 |
| 6,211,964 B1 * | 4/2001 | Luscombe et al. | .......... | 356/477 |
| 6,271,766 B1 | 8/2001 | Didden et al. | | |
| 6,591,025 B1 * | 7/2003 | Siems et al. | .................. | 385/12 |
| 6,724,319 B1 | 4/2004 | Knaack et al. | | |
| 6,728,165 B1 | 4/2004 | Roscigno et al. | | |
| 2007/0171400 A1 * | 7/2007 | Payton | ...................... | 356/73.1 |

* cited by examiner

*Primary Examiner*—Jack W. Keith
*Assistant Examiner*—Scott A Hughes
(74) *Attorney, Agent, or Firm*—Patterson & Sheridan, LLP

(57) ABSTRACT

Seismic sensor systems and sensor station topologies, as well as corresponding cable and sensor station components, manufacturing and deployment techniques are provided. For some embodiments, networks of optical ocean bottom seismic (OBS) stations are provided, in which sensor stations are efficiently deployed in a modular fashion as series of array cable modules deployed along a multi-fiber cable.

22 Claims, 15 Drawing Sheets

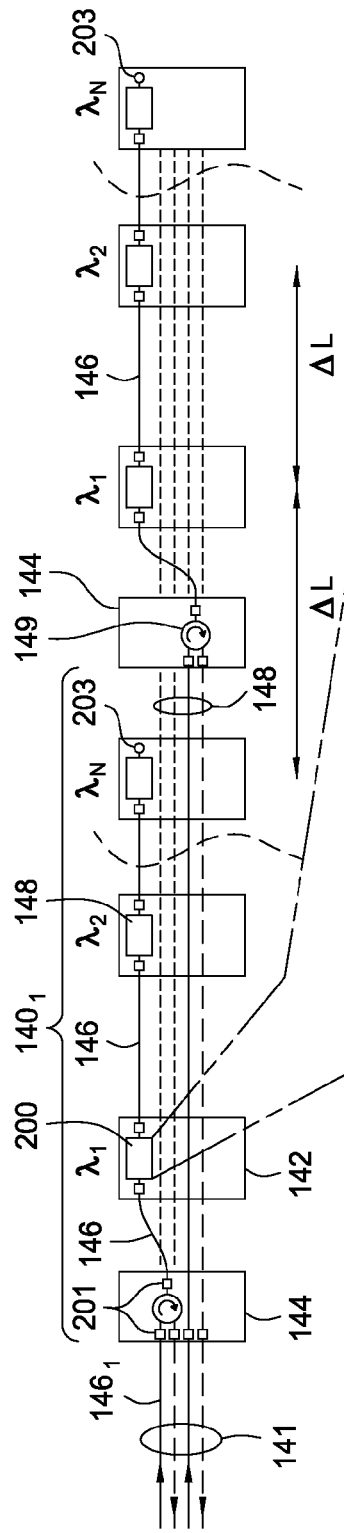
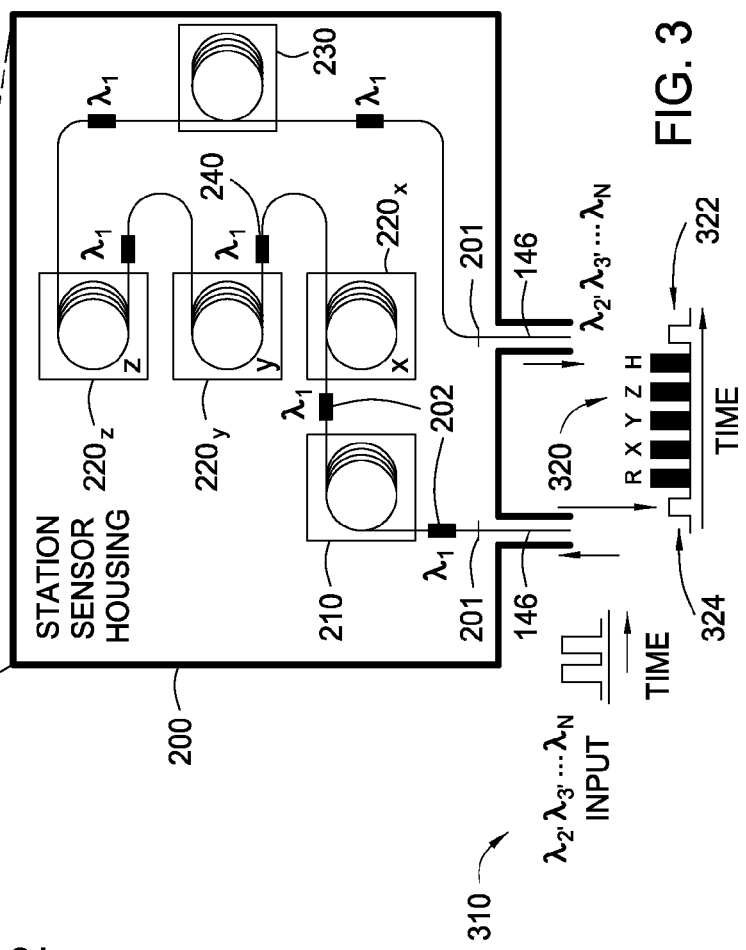
FIG. 2
FIG. 3

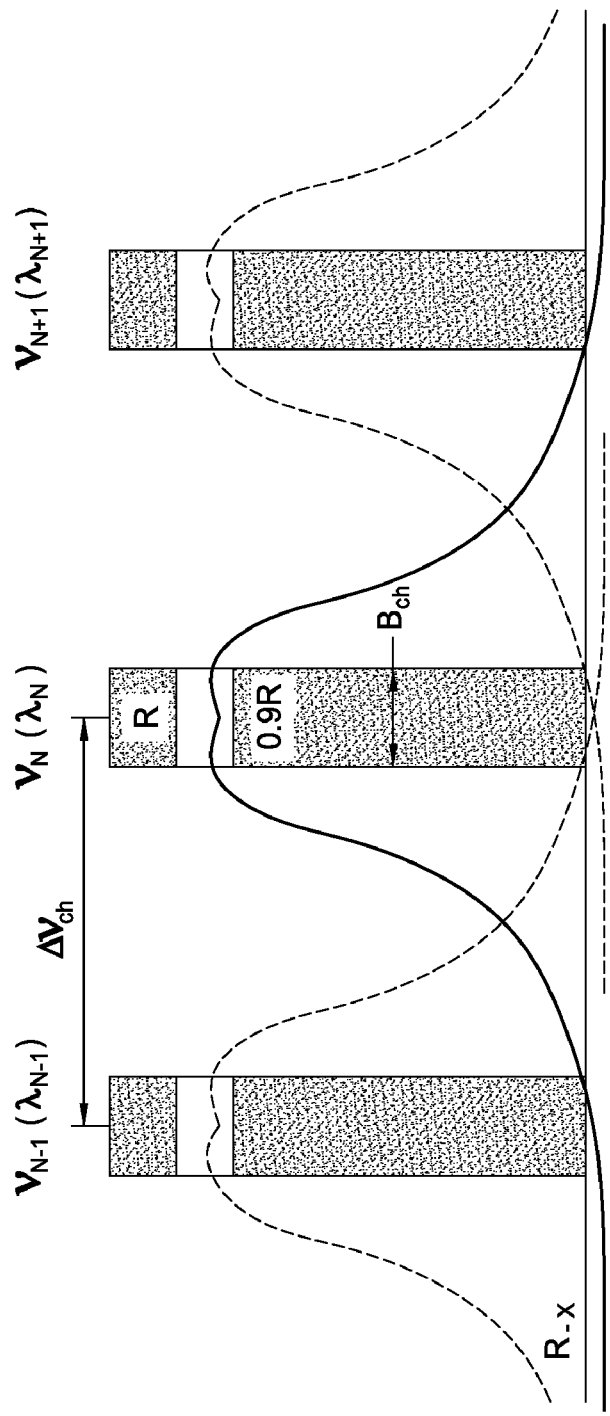
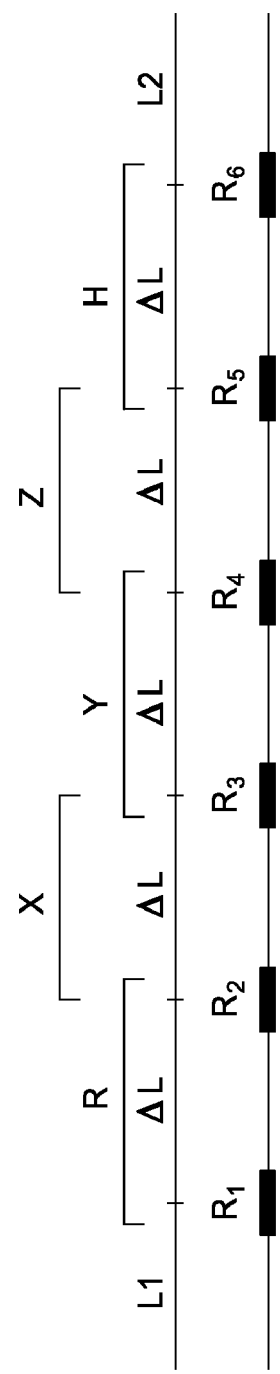
FIG. 6A
FIG. 6B (b) WDM - One Sensor FIMT (c) WDM - Two Sensor FIMTs

GRATING DESIGN FOR USE IN A SEISMIC SENSING SYSTEM

CROSS-REFERENCE TO RELATED APPLICATIONS

This is a continuation of U.S. patent application Ser. No. 11/381,880 filed May 5, 2006, now U.S. Pat. No. 7,366,055 which is hereby incorporated by reference.

BACKGROUND OF THE INVENTION

1. Field of the Invention

Embodiments of the invention generally relate to seismic sensing and, in particular, to components and techniques for deploying and interrogating arrays of seismic sensors, such as in ocean bottom seismic sensing (OBS) applications.

2. Description of the Related Art

Marine seismic exploration surveys for the exploration and monitoring of hydrocarbon producing zones and reservoirs utilize seismic cables having sensor arrays, i.e., a plurality of sensor stations interconnected by sections of cable. The cable arrays may include a large number of sensor stations (e.g., several hundreds or thousands) and may be buried in a pre-determined pattern on the ocean floor. Optical sensors may be particularly well suited for ocean bottom seismic (OBS) applications, due to their robust nature, lack of sensitive electronics, and potential for light weight sensors and cable assemblies that are relatively inexpensive to install. An optical sensor station may include optical hydrophones, accelerometers along multiple axes, and/or geophones.

The individual sensors in a station, such as accelerometers oriented in orthogonal X, Y, and Z axes, may be interferometers. In such systems, a light source generates interrogating light pulse pairs (spaced apart in accordance with a length of fiber between reflectors in each interferometric sensor), resulting in interfering signals reflected back to the surface. These interfering signals may be analyzed by surface electronics, and recorded and interpreted into seismic data.

As the total number of sensors in the arrays increases in high channel count (HCC) applications, it becomes a challenge to interrogate each sensor using a manageable number of optical fibers run to and from surface instrumentation. While multiplexing techniques, such as wavelength division multiplexing (WDM) and time division multiplexing (TDM) are well known, there are typically limits to each. On the one hand, there is a practical limit as to how many sensors may be interrogated by a single fiber, due to a limited number of wavelengths and limitations on total transmitted power per fiber set by optical nonlinear interactions. On the other hand, TDM of multiple interferometric sensors using reflectors of a common wavelength are subject to unwanted reflections between sensor elements (causing cross-talk).

In some cases, in order to generate sufficient optical power to interrogate a high number of sensors in an OBS array, relatively expensive components, such as remotely pumped sources and optical amplifiers may be used. Unfortunately, such remotely deployed components are relatively expensive and typically require special pressure sealed housings to be operated at the high pressures seen at the ocean bottom. Replacing failing components remotely located subsea is an expensive and time-consuming process.

Packaging and deployment of OBS sensor arrays also create challenges in order to achieve efficient coupling of the seismic signals to the respective sensors. Station packaging should ensure sufficient protection of the sensors during installation and operation, and should also withstand hydrostatic pressures typical at the ocean bottom (e.g., 50-200 bar). The packaging and station design should ensure high reliability over a relatively long expected lifetime and efficient assembly procedures in order to reduce overall manufacturing costs.

Cutting and splicing data transmission cables/fibers within the cable array at each of the sensor stations increases time and cost while decreasing reliability. Design of the sensor station and/or cable array can affect how many splices are required at each station. Accordingly, any designs or techniques that reduce the number of splices of the data transmission cables/fibers at each station decreases assembly time and cost while increasing reliability of the cable array.

Therefore, there exists a need for an inexpensive and improved OBS sensor system with a large number of sensors, as well as corresponding cable and sensor station components, manufacturing and deployment techniques.

SUMMARY OF THE INVENTION

Embodiments of the invention generally relate to seismic signal processing methods, apparatus and systems.

One embodiment provides a seismic sensing system generally including one or more series of seismic sensor stations and instrumentation. Each station houses a plurality of optical sensors sharing a common wavelength, the common wavelength being different for each station in a same series. The instrumentation is coupled to the series of seismic sensor stations and configured to interrogate sensors housed in each station using time division multiplexing (TDM) and to interrogate sensors housed in different sensor stations in each series using wavelength division multiplexing (WDM).

Another embodiment provides an array of seismic sensor stations generally including at least one array connection module and a plurality of array cables extending from the array connection module. Each array cable includes a series of array cable modules and a multi-fiber lead cable, each array cable module including a series of seismic sensor stations, each station housing a plurality of optical sensors sharing a common wavelength, the common wavelength being different for each station in a same series. The array also includes, for each array cable module, a module connection node to couple a different one or more of fibers of the lead cable to a sensor fiber used to interrogate a series of corresponding seismic sensor stations.

Another embodiment provides an array cable module generally including a cable section extending a length of the array cable module and having plurality of optical fibers and a plurality of seismic sensor stations. Each station houses a plurality of serially connected interferometric sensors sharing a common wavelength, wherein the common wavelength of each station is different. The system also includes at least one sensor fiber for interrogating the sensors in each of the stations and a module connection node configured to optically couple at least one of the plurality of fibers of the cable section to the sensor fiber while a remaining one or more of the plurality of fibers of the cable section bypass the sensor stations without optical coupling.

Another embodiment provides a method of gathering seismic data from a series of seismic sensor stations, each station housing a plurality of optical sensors sharing a common wavelength, the common wavelength being different for each station in a same series. The method generally includes interrogating, via a common optical path, sensors housed in each station using time division multiplexing (TDM) and interrogating, via the common optical path, sensors housed in different sensor stations in each series using wavelength division multiplexing (WDM).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates an exemplary sensor array cable module configuration, in accordance with one embodiment of the present invention.

FIG. 3 illustrates a schematic view of an exemplary sensor station, in accordance with one embodiment of the present invention.

FIG. 6A illustrates an exemplary grating profile, showing three neighboring wavelength channels, suitable for gratings of a seismic sensor station, in accordance with one embodiment of the present invention.

FIG. 6B illustrates an exemplary arrangement of gratings and corresponding reflectivities within a sensor station, in accordance with one embodiment of the present invention.

DETAILED DESCRIPTION

Figure 1A:
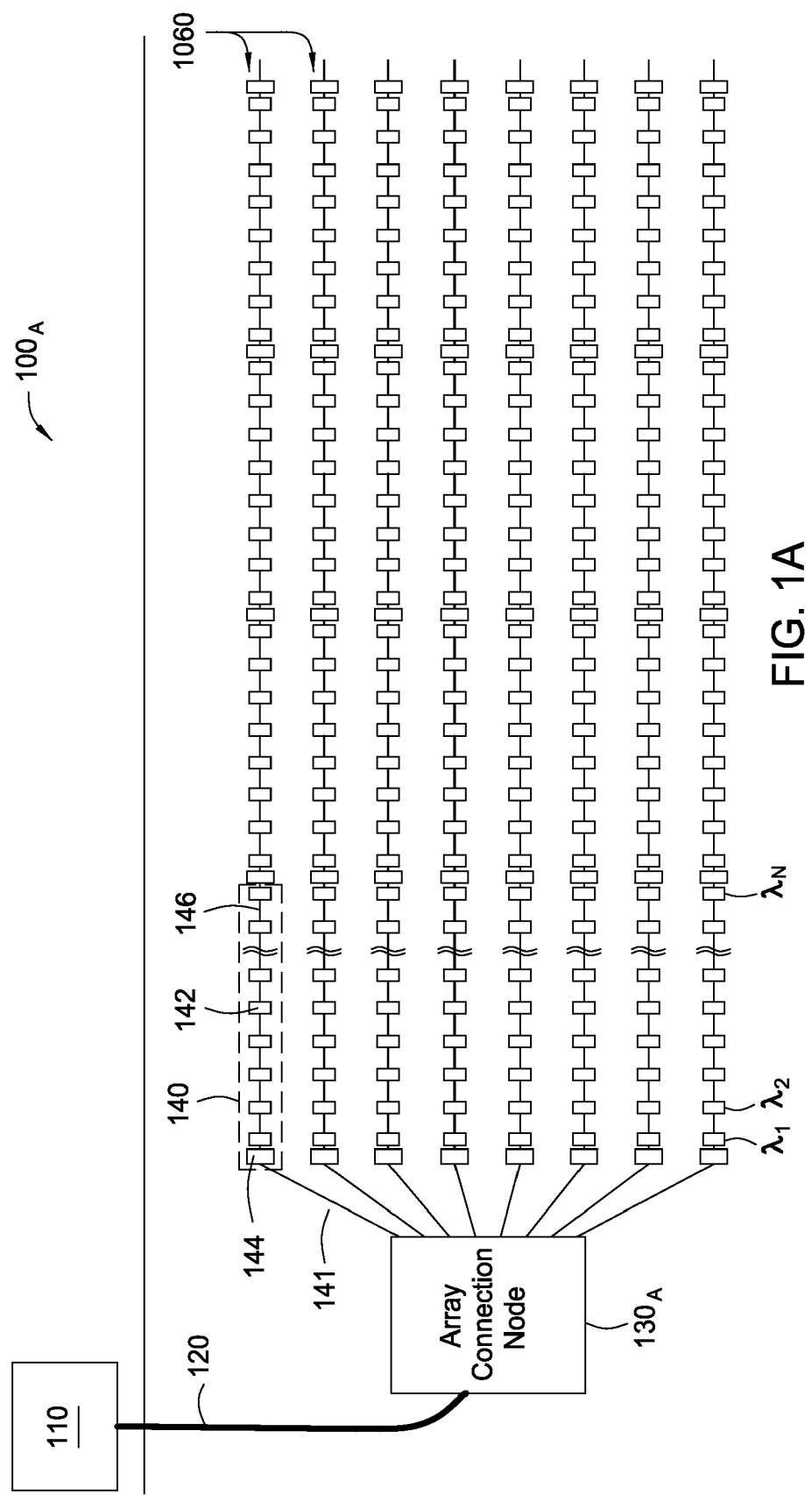
FIGS. 1A and 1B illustrate exemplary ocean bottom seismic (OBS) sensing system topologies in accordance with embodiments of the present invention.

Embodiments of the invention generally relate to seismic sensor systems and sensor station topologies, as well as corresponding cable and sensor station components, manufacturing and deployment techniques. For some embodiments, networks of optical ocean bottom seismic (OBS) stations are provided, in which sensor stations are efficiently deployed in a modular fashion as series of array cable modules deployed along a multi-fiber cable.

Interferometric sensors within each sensor station may share a common wavelength and be interrogated in a time division multiplexed (TDM) manner. Each sensor station, however, may utilize a different wavelength for its sensors, allowing multiple stations in series within an array cable module to be interrogated on a common "sensor" fiber utilizing wavelength division multiplexing (WDM).

For some embodiments, within each array cable module, only the sensor fiber is connected to the sensors at each station, while a multi-fiber tube "bypasses" each sensor station with no connections and, hence, no cutting or splicing. At a transition point between array cable modules, a module connection node may be used to connect a different fiber from the multi-fiber tube to the sensor fiber used to interrogate the next series of sensor stations. In such embodiments, only the sensor fiber needs to be spliced at each sensor station, in order to connect to the sensors for that station.

Ocean bottom seismic (OBS) sensing systems are described below as a particular, but not limiting, example of an application in which embodiments of the present invention may be used to advantage. However, those skilled in the art will recognize that the concepts described herein may be used to similar advantage in a wide variety of other applications in which a large number of optical sensors are interrogated.

Other examples of where similar sensor arrangements that may be contained in a common housing and interrogated via the methods described herein (such as a tubular element or mandrel) include flow meters utilizing arrays of linearly apart sensors. Such flow meters are described in detail in U.S. Pat. No. 6,785,004, entitled "METHOD AND APPARATUS FOR INTERROGATING FIBER OPTIC SENSORS," commonly owned with the present application, herein incorporated by reference in its entirety.

Further, while embodiments of the present invention will be described with reference to optical fibers, those skilled in the art will recognize that any type of suitable optical waveguide may be used as well. Further, while embodiments of the present invention will be described with reference to sensor elements utilizing inline reflective elements such as FBGs to create interferometers, those skilled in the art will recognize that concepts described herein and recited in the claims may, in some cases, also be applied to interferometers utilizing transmissive elements (with analogies drawn between transmissive properties and reflective properties) and, more generally, to a wide variety of optical sensors.

An Exemplary OBS Sensor System

FIG. 1A illustrates an exemplary OBS system $100_A$ in accordance with one embodiment of the present invention. The system $100_A$ includes an instrumentation unit 110 configured to interrogate an array of sensor stations 142, which may be deployed along a plurality of array cables 1060 extending from an array connection module 130A. As illustrated, each array cable 1060 may include a series of array cable modules 140, with each array cable module including a module connection node 144 and a series of sensor stations 142.

For some embodiments, the instrumentation unit 110 may be located on the sea surface ("topside"), for example, on a boat or platform. For other embodiments, the instrumentation unit 110 may be located underwater, for example, within a water-tight chamber in the sea (e.g., on the sea floor). In such cases, either optical or electrical cables may be used to pass processed data from the instrumentation unit to a platform, ship, or to an on shore data recording or processing center.

A lead cable 120 may connect the instrumentation 110 and the array connection module 130A. The lead cable 120 may be a proprietary or standard cable suitable for sub-sea deployment, of varying length depending on the particular application, for example, ranging from 1-50 km. The lead cable 120 may include one or more fibers to carry interrogating light pulses to the sensor stations and to carry reflected light pulses from the sensor.

The total number of fibers in the lead cable 120 may depend, among other things, on the total number of array cable modules to be interrogated. As will be described in greater detail below, for some embodiments, the lead cable 120 may include at least two fibers for each array cable module, including one for carrying interrogating light pulses and a separate one for carrying return (e.g., reflected) light pulses. In such cases, array connection modules may include connections to couple two fibers from the lead cable 120 to each array cable module in an array cable. Further, the type of fibers contained therein may be selected based on a number of factors, such as non-linearity, polarization properties and overall loss.

For some embodiments, the lead cable 120 may be deployed while separated from the array cable modules 140 (e.g., on the ocean bottom) and later be connected to the array cable modules. In such embodiments, the array connection module 130A may be referred to as a "wet connection" node because the connection is made sub-sea. The array connection module 130A may have a pressure sealed housing containing a fiber distribution network, with a different group of fibers 141 routed to interrogate sensor stations 142 along correspondingly different cable arrays 1060. The array connection module 130A may also comprise optical connectors, for example wet-mate connectors. As will be described in greater detail below, a module connection node 144 of each array cable module 140 may connect a different fiber from a fiber group 141 to a sensor fiber 146 used to interrogate all sensor stations 142 within a single array cable module 140.

Figure 1B:
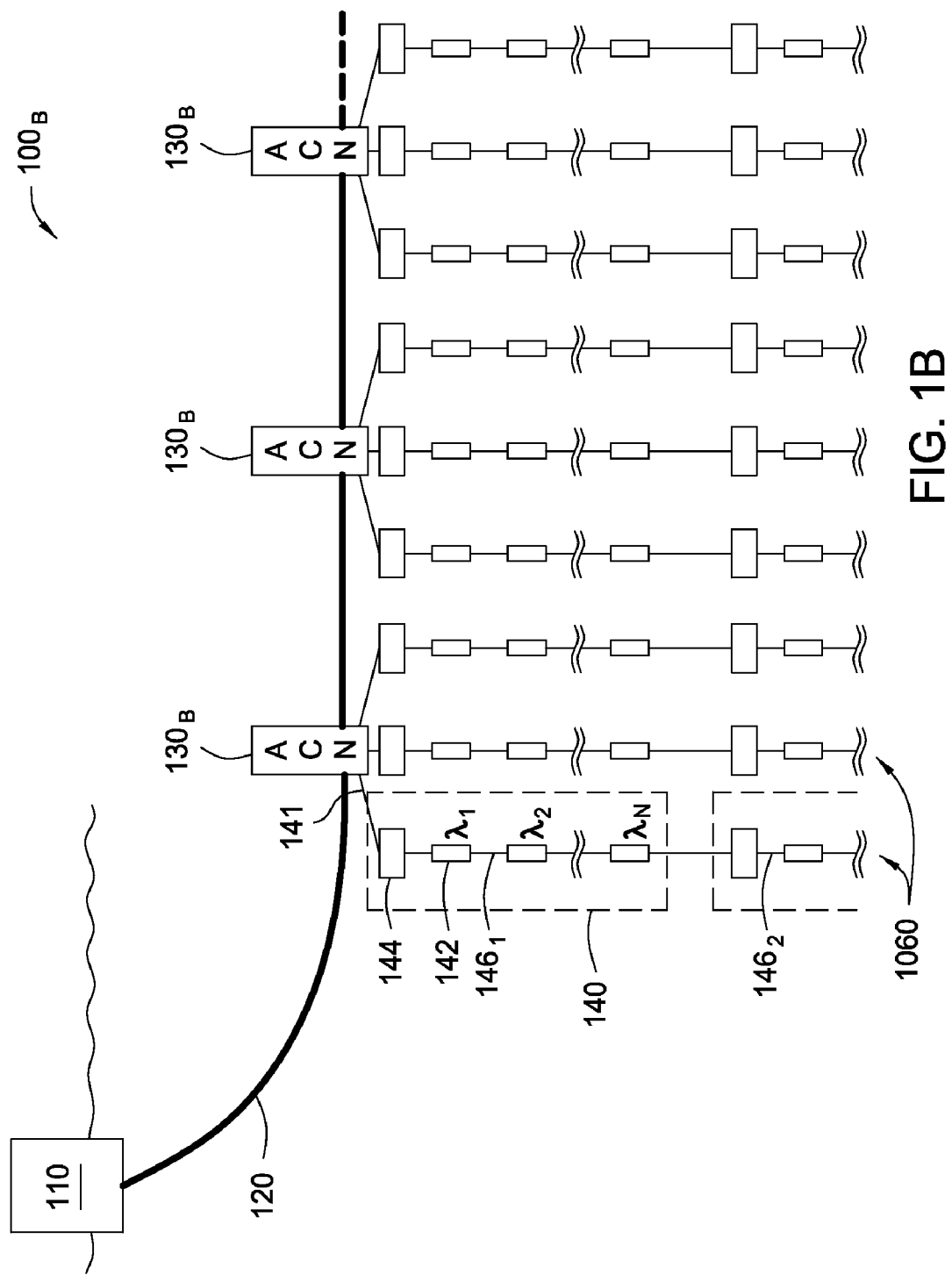

As illustrated in FIG. 1B, for some embodiments, multiple array connection modules 130B may be utilized, with one or more array cables 1060 (and corresponding series of array cable modules 140) extending from each. Similar or the same type of array cables 1060 and/or array cable modules 140 may be utilized in either topography shown in FIG. 1A or FIG. 1B. In practice, the particular choice of network topology (e.g., between that shown in FIG. 1A, FIG. 1B, or some other type of topology) will typically depend on the oil field/reservoir topology to be mapped and existing seabed infrastructure.

For some embodiments, sensor stations 142 within a series of array cable modules 140 may be interrogated utilizing a combination of both wavelength division multiplexing (WDM) and time division multiplexing (TDM). As an example, various sensors within a station 142 (e.g., x, y, z accelerometers, a reference interferometer and a hydrophone as shown in FIG. 3) may be interferometric sensors with reflective elements (e.g., gratings) that share a common wavelength and, thus, may be interrogated via TDM.

However, as illustrated in FIG. 2, each of the (N) different stations 142 within an array cable module 140 (interrogated with a common sensor fiber 146) may use a different wavelength (e.g., $\lambda 1$-$\lambda N$) for its sensors. Thus, multiple stations 142 within an array cable module 140 may be interrogated, via WDM, using a common sensor fiber 146. The number of stations (N) may be limited by a variety of parameters, such as the spectral bandwidth available, the amount of loss through each station, and total fiber length with signals propagating in both directions (Rayleigh scattering). In any case, a total length of several kilometers, with up to 10-100 stations per array cable module are achievable, for example, with N=20 in one embodiment.

Different sensor stations (i.e. interrogated on different wavelength channels) will experience a different loss depending on their position within the array cable. Thus, for some embodiments, wavelength channel ordering in the sensor array may be controlled in an effort to reduce cross-talk. The order of the wavelengths within an array cable module can be selected to be any possible order of N different wavelengths.

Loss contributed from splices may be controlled by reducing the overall number of splices required in the system. For one embodiment, the only splices required at each station 142 may be to couple a single sensor fiber 146 (shared with other stations 142 in the same array cable module 140) to the sensors of that station. A remaining set of fibers may "bypass" the sensors in the station in an uncut multi-fiber tube 148 (e.g., a fiber in metal tube or FIMT).

As illustrated in FIG. 2, at a transition between array cable modules 140, a module connection node 144 may be used to couple a different fiber from the multi-fiber tube 148 to the sensor fiber 146 of a subsequent array cable module 140. The module connection node 144 may utilize any suitable components for such a transition, such as an optical circulator 149, optical coupler, wavelength multiplexer and the like. Further, as will be described in greater detail below, with reference to FIGS. 12 and 13, the exact components may depend on the particular array topology utilized for a given embodiment.

In any case, a different pair of fibers of the multi-fiber tube 148 (where one fiber in the pair is used for down lead and one for up lead) may be used to interrogate the N sensor stations 142 (e.g., with wavelengths $\lambda 1$-$\lambda N$) of each different array cable module. Thus, N sensor stations may be interrogated per pair of fibers in the multi-fiber tube 148, with cutting into the multi-fiber tube 148 to couple a new pair of fibers to the sensor fiber 146 of a subsequent array cable module (via circulator(s), coupler(s), WDM(s) or similar components) occurring only at the module connection nodes 144. This reduced number of splices simplifies overall array design and may significantly reduce manufacturing costs. This also reduces transmission losses to and from the array cable modules, reducing problems with optical nonlinearity and the need for expensive optical power amplifiers. The module connection nodes 144 may be separate components, or for some embodiments, may be integrated within a seismic station 142, providing a compact and efficient design. Particular designs, as well as methods for such splicing and corresponding management of a sensor fiber and multi-fiber tube is described in detail in the commonly-owned U.S. patent application Ser. No. 11/313,275, filed Dec. 20, 2005 entitled "OCEAN BOTTOM SEISMIC STATION."

An Exemplary Seismic Sensor Arrangement

FIG. 3 illustrates a schematic view of an exemplary arrangement of seismic sensors within a seismic sensor station housing 200, in accordance with one embodiment of the present invention. As illustrated in FIG. 3, a section of sensor fiber 146 leading to or from a sensor station 144 may be spliced onto a sensor fiber section that passes through the sensor station housing 200. As illustrated, the housing 200 may include a variety of different sensors, to which the sensor fiber 146 may be connected with only two splices 201. At the last station (λN) in an array cable module 140, the sensor fiber 146 may be connected to a terminating connection 203.

As illustrated in FIG. 2, additional fibers may pass through the station 144 without connection to the sensors, thus avoiding cutting and splicing for those fibers. Each of these fibers may be later connected to a sensor fiber 146 of a subsequent array cable module 140 in the series and used to interrogate sensors therein. As illustrated by the small dashed lines, after a fiber has been connected to an array cable module 140, that fiber may be subsequently left unconnected.

In the illustrated arrangement, the housing 200 contains a reference interferometer 210, orthogonal X, Y, and Z accelerometers 220 (220X, 22Y, and 220Z, respectively), and a hydrophone 230. As described in the above-referenced application, the accelerometers 220 may be arranged in some type of liquid filled compartment of the housing 200 for dampening of mechanical resonances caused by mechanical disturbances and pressure fluctuations. The housing may also include a mechanism for transferring pressure variations between the surrounding environment and an inside of a second compartment containing the optical fiber coil of the hydrophone 230. The reference interferometer can be used to compensate for interrogating laser frequency fluctuations or phase perturbations in a compensating interferometer 528 (described in greater detail below) or in the lead cable as described in the commonly-owned U.S. patent application Ser. No. 10/693,619, filed Oct. 24, 2003 entitled "Downhole Optical Sensor System with Reference."

Each of the sensors 210, 220, and 230, may be formed by a length of fiber (e.g., a coil) separating a pair of gratings 202 formed therein. For some embodiments, the gratings 202 may be fiber Bragg gratings (FBGs). Further, as will be described in greater detail with reference to FIGS. 6A and 6B, the optical properties of the gratings, including the features of the reflective spectrum, may be controlled to reduce cross-talk between sensors within the same station, as well as sensors from other stations.

While each sensor may be formed by two gratings, gratings may be shared between sensors, such that only M+1 gratings are required for M interferometric sensors. For example, in the illustrated arrangement, six gratings with overlapping channel (reflection) bands are used to form the five sensors shown.

Figure 4:
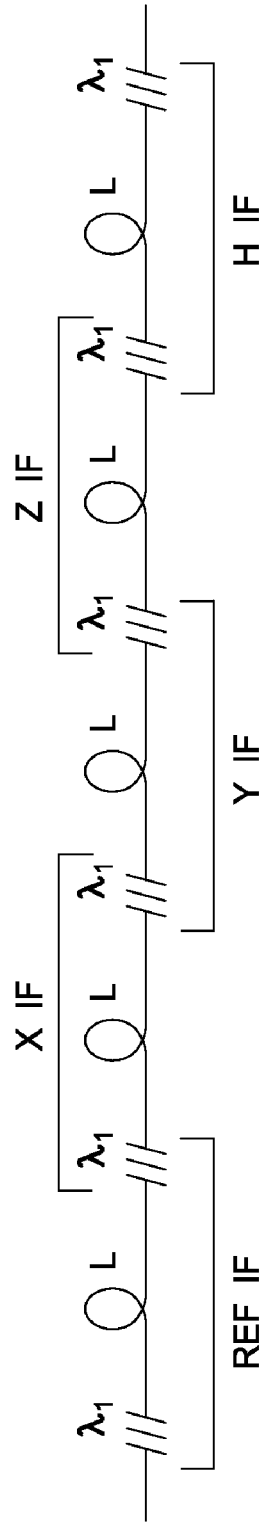
FIG. 4 illustrates a basic configuration of sensors within a sensor station, in accordance with one embodiment of the present invention.

As illustrated in FIG. 4, the reference interferometer 210 may be formed by a coil separating gratings $202_1$ and $202_2$. The x, y, and z accelerometers 220 may be formed by coils separating gratings $202_2$ and $202_3$, $202_3$ and $202_4$, and $202_4$ and $202_5$, respectively, while the hydrophone 230 may be formed by a coil separating gratings $202_5$ and $202_6$. For some embodiments, the gratings may be formed in the fiber section, with appropriate spacing prior to wrapping the coils, resulting in spacing (optical path length), L, after wrapping. Forming the gratings in this manner may eliminate the need for splices between sensors, reducing loss, manufacturing time and, thus, overall cost.

Any change in the optical path lengths between the fiber Bragg gratings, as will typically result from external influences on the accelerometer or hydrophone fiber coils, will alter the resulting superposed reflected signal from one seismic stations. U.S. Patent Publication No. 2005/0097955, describes examples of interferometric accelerometers for determining acceleration and methods of fabricating such accelerometers. The accelerometers are based on a rigid frame, a mass movably suspended on the rigid frame and a sensing coil partially wrapped around surfaces of first and second elements to detect movement of the mass in response to an acceleration based on a change in length of the sensing coil.

A general problem of arranging a hydrophone together with x, y, and z accelerometers (or geophones) in a four-component (4-C) seismic sensing station is the cross sensitivity between the hydrophone and the accelerometers. While it is generally desirable to optimize the exposure of the hydrophone to pressure variations it is generally undesirable to let pressure variations influence the geophones/accelerometers. The influence of the pressure signal on the geophones/accelerometers creates an undesirable cross sensitivity. For some embodiments, the sensor station and housing may be designed to reduce such influence, and may be designed in accordance with one of the seismic sensor station housings described in detail in the commonly-owned U.S. patent application Ser. No. 11/381,922, filed May 5, 2006, entitled "Seabed Seismic Station Packaging" herewith.

Referring back to FIG. 3, in order to interrogate the sensors, an optical "double pulse" signal 310 of a wavelength (λ1 in the illustrated example) within the channel (reflection) bandwidth of the gratings $202_1$-$202_6$ is launched into the optical fiber section inside the housing 200. The time delay between the two pulses is chosen to match the optical propagation (round trip) delay between each pair of consecutive gratings 202. Thus, in the optical signal reflected from the gratings, a reflection of the second pulse from the first fiber grating will superimpose on the reflection of the first pulse from the second fiber Bragg grating.

For the illustrated arrangement of sensors, utilizing a total of six gratings 202, a total of five interfering (superimposed reflected) pulses 320 will be produced containing the sensor signals followed by trailing pulses 322. In some cases, sensor cross-talk may be caused by multiple reflections (i.e., reflected pulses that are reflected again and interfere with another pulse). As will be described in greater detail below with reference to FIG. 9, measures may be taken to reduce the impact of such cross-talk, for example, by applying an inverse scattering algorithm, such as layer-peeling, within the instrumentation unit.

As previously described, several seismic stations may be interrogated via a common sensor fiber 146 using wavelength multiplexing, by choosing different wavelengths for the gratings of each seismic sensor station. Illustratively, the gratings of the shown seismic sensor station is set at a first optical wavelength λ1, while the interrogating optical signal may comprise light at other wavelengths λ2, λ3, λ4, . . . λN, intended for other seismic sensor stations and will pass virtually un-reflected through the shown seismic station.

The embodiments described above utilize TDM within each station and WDM between stations. As an alternative, some embodiments may utilize a multiplexing configuration employing WDM within each station and TDM between each station. General concepts of such a multiplexing scheme are described in U.S. Pat. No. 5,987,197, herein incorporated by reference. When compared to the multiplexing scheme shown in the figures and described above, a scheme utilizing WDM within a sensor station will require additional gratings (and possibly additional splices), as gratings with different wavelengths will not be shared between serially connected interferometers. Further, for some embodiments, within the same station, a plurality of sensors sharing a common wavelength may be interrogated via TDM, while one or more sensors having different wavelengths may be interrogated via WDM.

Exemplary Instrumentation

Figure 5A:
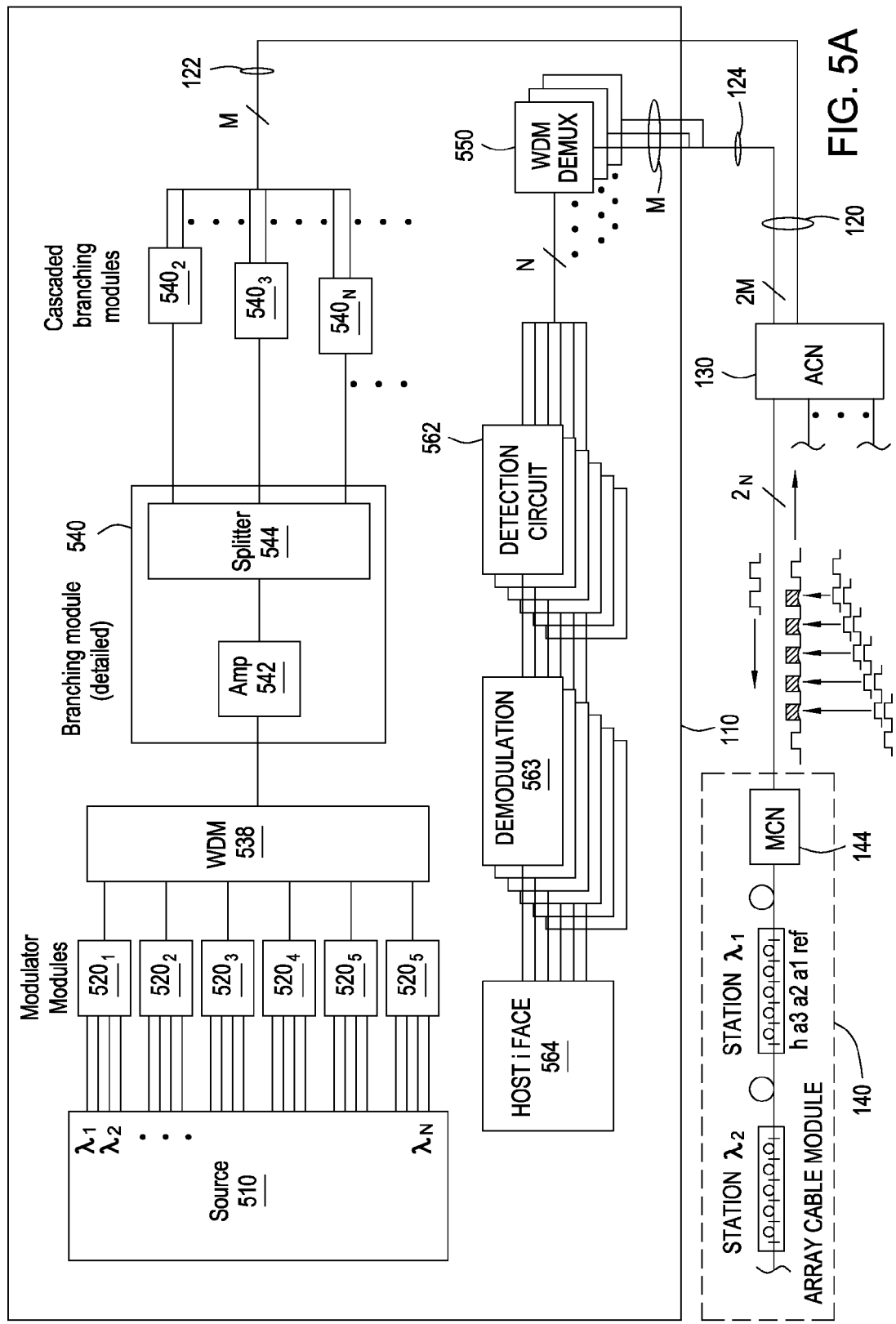
FIGS. 5A and 5B illustrate a schematic view of instrumentation of the system of FIG. 1, in accordance with one embodiment of the present invention.

FIG. 5A illustrates a schematic view of the instrumentation unit 110 of the system of FIG. 1, in accordance with one embodiment of the present invention. In general, the collective components in the instrumentation is designed to generate interrogating light pulse pairs with wavelengths (λ1-λN) corresponding to the sensor stations, as described above, and process the resulting interfering reflected pulses to extract seismic data therefrom. While the instrumentation unit 110 shown includes components for performing both of these functions, for some embodiments, separate components performing the pulse generation and signal processing functions may be provided in separate units.

As illustrated, the instrumentation may include a light source 510 capable of producing light signals with multiple wavelengths (λ1-λN). The light source 510 may include any suitable components, such as multiple fiber lasers, to generate suitable light signals. Suitable light signals may include, for example, continuous wave light signals with low intensity and frequency fluctuations, unless coherence modulation may be applied directly to each wavelength inside the light source (as will be discussed in greater detail below). For some embodiments, the light source 510 may be configured with a high birefringence polarization maintaining output fiber with the polarization of the fibers output light aligned with one of the birefringence axes.

Figure 5B:
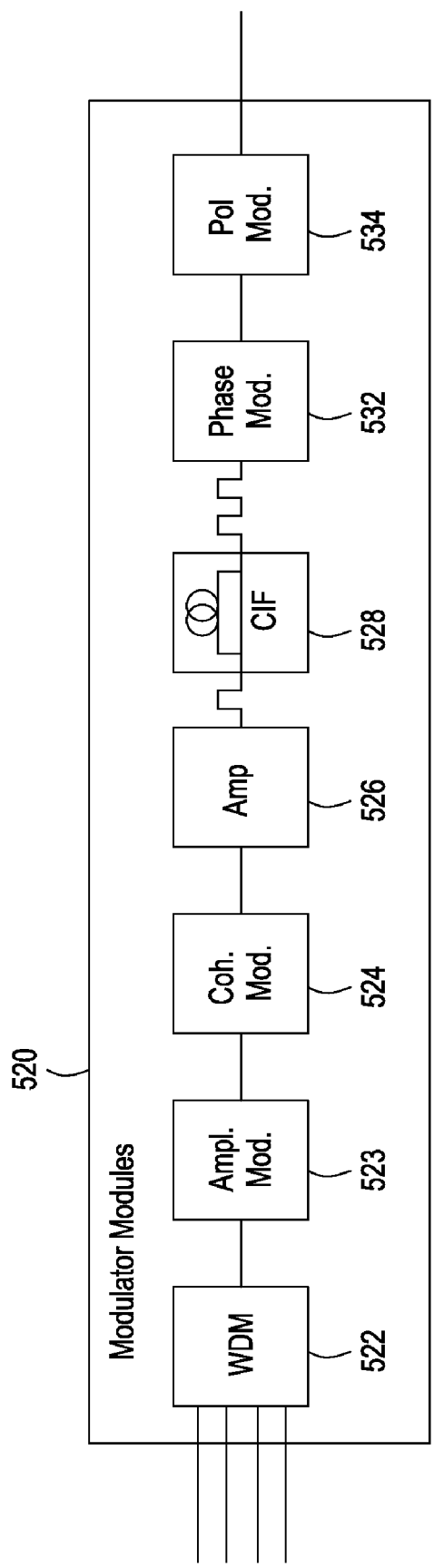

As illustrated, separate light signals at different wavelengths may be output to one or more of modulator channels 520. If multiple modulator channels are used, different wavelengths may input to each modulator channel. As illustrated in FIG. 5B, multiple wavelengths input to one modulator channel may be combined by a wavelength division multiplexing (WDM) unit 522 to combine the signals of multiple wavelengths onto a common fiber. Each modulator channel 520 may include any suitable components to shape the amplitude, coherence properties, phase and polarization state of the light signals generated by the source 510. For some embodiments, a modulator channel 520 may include an intensity modulator unit 523 and a coherence modulation unit 524 to shape optical pulses and control their coherence properties, amplifier(s) 526 to compensate for losses in the modulators. A modulator channel may also include a compensating interferometer (CIF) 528 to split single pulses into double pulses, phase modulator(s) 532 to control the phase of the pulses and polarization modulator(s) 534 to control the polarization state of the output light. The exact type of modulators used may depend, for example, on the output of the light source. For example, assuming the light source 510 is configured to produce polarization maintained light signals, particular modulators, such as Lithium Niobate modulators, may be used for one or more of items 523, 524, 532 and 534.

As described in the commonly-owned U.S. patent application Ser. No. 10/961,326, entitled "Active Coherence Reduction for Interferometer Interrogation," herein incorporated by reference in its entirety, the complex field amplitude of the signal interrogating an optical interferometer may be modulated (coherence modulation) in such a way that the temporal coherence is reduced, thus reducing the sensitivity to unwanted reflections with time delays that are different from the sensor reflector. For some embodiments, the optical field phasor of the light source 510 may be modulated in a controlled manner to produce a broadened optical source power spectrum. This may be achieved through some direct source modulation, for instance through modulation of laser cavity parameters changing the laser frequency or phase or through modulation of laser pump signals. It can also be achieved through modulation of the light inside the coherence modulation unit 523 that may be included in the modulation channel(s).

A compensating interferometer (CIF) 528, having a delay difference similar to the delay difference of sensors in the sensor stations 142 may be arranged in a serially coupled manner at the output of the signal conditioning logic 520 to produce pulse pairs suitable for producing interfering reflected pulses from the gratings in the sensor stations 142.

The output from the compensating interferometer 528 may be sent to additional modulators, which may include suitable components, such as phase modulator 532 and polarization modulator 534 to modulate the phase difference between pulses in each pulse pair that will result in subcarrier modulation of the interference signals reflected from the sensors allowing for sensor phase demodulation without ambiguity, and to perform polarization conditioning for polarization insensitive sensor interrogation, for example, in accordance with commonly owned U.S. patent application Ser. Nos. 10/649,590 and 11/056,970, entitled "METHOD AND APPARATUS FOR PRODUCING DEPOLARIZED LIGHT," and "METHOD AND APPARATUS FOR PROVIDING POLARIZATION INSENSITIVE SIGNAL PROCESSING FOR INTERFEROMETRIC SENSORS." In addition, the common phase or frequency of interrogating pulse pairs can be modulated to reduce cross-talk and noise caused by unwanted reflections in the system, according to the commonly owned U.S. patent application Ser. No. 11/056,970, entitled "METHOD AND APPARATUS FOR SUPPRESSION OF CROSS-TALK AND NOISE IN TIME-DIVISION MULTIPLEXED INTERFEROMETRIC SENSOR SYSTEMS," all of which are herein incorporated by reference in their entirety.

Figure 8:
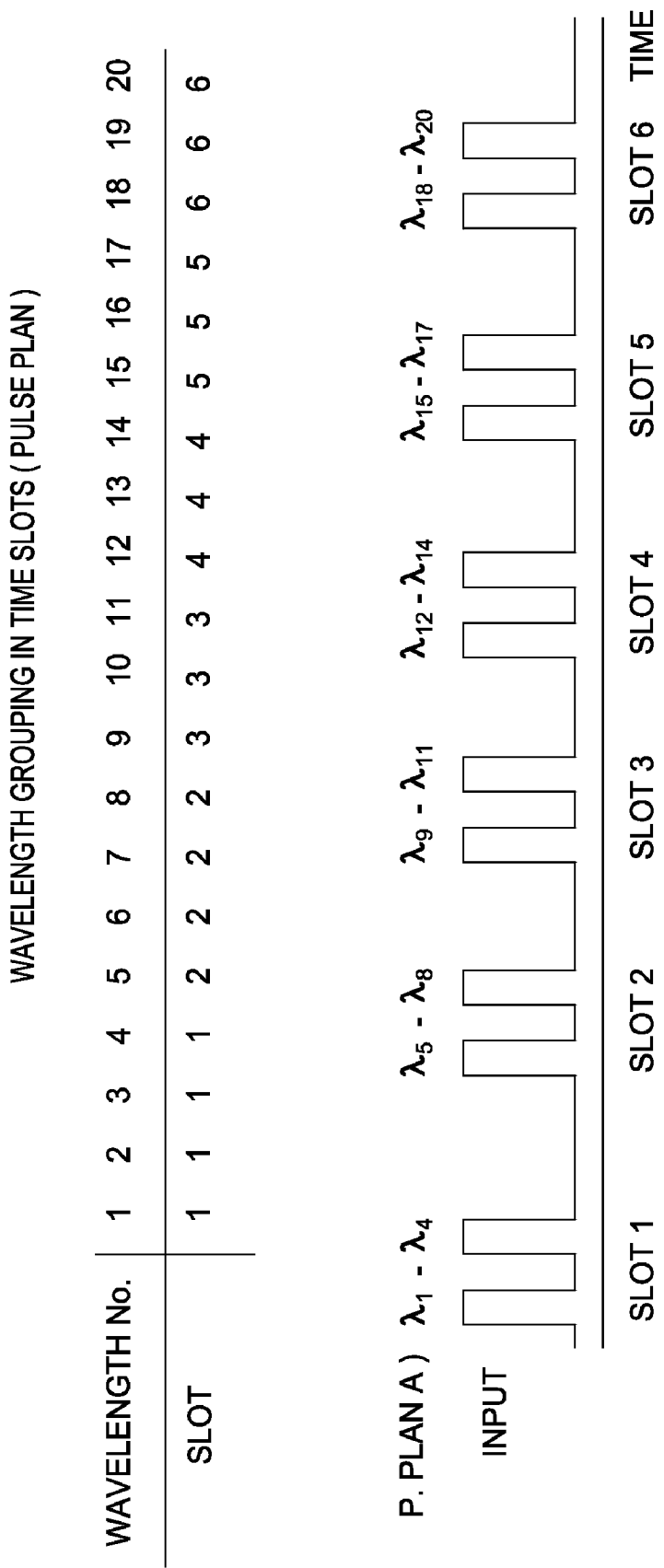
FIG. 8 illustrates exemplary groupings of wavelengths within multiple pulse pair time slots, in accordance with embodiments of the present invention.

As an option, for some embodiments, the instrumentation may include means for spreading the different wavelength channels out in time (e.g., distributing them in different pulse pairs). Spreading the wavelengths out in this manner may reduce peak optical power levels, and hence reduce non-linear effects, such as stimulated Raman scattering (SRS), four wave mixing (FWM), self-phase modulation and cross-phase modulation (SPM/XPM), in the fibers, which can degrade the system performance The wavelengths can be spread out in time by grouping the wavelengths, e.g. with λ1-λ4 in group 1, λ5-λ8 in group 2, etc. Then each group can allocate a different time slot. As an example, a TDM rate of 2000 ns and 300 ns duration of each pulse-pair allows for 6 time slots, as illustrated in FIG. 8.

Allocation of different wavelengths to different time slots can be achieved by transmitting different groups of wavelengths through different modulator channels 520, as suggested in FIG. 5, and activating the modulators in different channels to generate pulses at different times. In some cases, this may be beneficial by allowing each modulator to be optimized for a limited wavelength range. Alternatively, spreading of wavelengths in time can be achieved by having different optical delays (fiber coils with different lengths) for different groups of wavelengths.

In any case, referring back to FIG. 5A, the modulated signals from groups of wavelengths in different wavelength bands may then be fed into a wavelength division multiplexing (WDM) unit 538, to combine all wavelengths into one fiber. The output from 538 may be passed through a branching module 540 that contain a splitter 544 that divides the multi-pulse multi-wavelength signal into multiple fibers. Several branching modules 540 may be cascaded in a tree topology to split the interrogation signal into a required number of down lead fibers 122 that may be combined into one or more down lead cables 120. Note that a down lead cable may in many cases also serve as an uplead cable containing uplead fibers in addition to downlead fibers. Some branching units may include a broadband optical power amplifier 542 to compensate for the splitting loss and generate required output powers. It may also be possible to amplify signals and maybe also compensate for splitting loss at a later point (e.g., with locally or remotely pumped subsea amplifiers and/or sources). However, it is typically less expensive to use an amplifier to boost the signal at the surface, rather than to put amplifiers subsea.

The downlead fibers 122 may propagate the interrogating pulse pairs to the sensor interferometers of the seismic sensor stations 142 (e.g., located on the sea floor). As previously described, the use of wavelength selective FBG reflectors in the interferometric sensors within the stations 142 allows for wavelength division multiplexing (WDM) of multiple stations in series on a single downlead fiber 122 (e.g., N stations, with corresponding wavelengths $\lambda 1$-$\lambda N$).

In response to the interrogating pulse pair 310, the gratings in each sensor station will reflect light in a corresponding wavelength channel, creating interfering pulses 320. The pulses 320 may be directed back up to the detecting portion of the instrumentation unit 110 (e.g., by a circulator 123 contained in a module connection node 144.), via upload fibers 124. As illustrated, an array connection module 130 may be included to route upload and download fibers from the lead cable 120 to/from appropriate series of array cable modules 140. As illustrated, the detecting components may include WDM demultiplexers 550 (e.g., one for each upload fiber 124) that splits the different sensor wavelengths to different detector circuits 562. Electrical signals generated at each detector circuit 562 may be passed to a demodulation processing unit 563 to be processed, for instance by any known technique in the art to extract the sensor phases of that wavelength channel and corresponding seismic data from each sensor station 142. Demodulated sensor data from the processing unit be may transmitted further (via a host interface 564) to a host computer for storage and quality control.

For some embodiments, a monitoring unit (not shown) after each modulator channel may monitor the output light signals and adjust one or more parameters of the modulator channels accordingly. As will be described in greater detail below with reference to FIG. 9, for some embodiments, the demodulation processing unit 563 or the host computer 570 may be configured to perform a layer peeling algorithm in an effort to reduce the effects of cross-talk between sensors within a station. Further, for some embodiments, the host computer 570 may be configured to command the source unit 510 to adjust the wavelength of the optical signals generated, for example, to account for detected changes in wavelengths of the sensor station gratings over time, for example through changes in temperature.

Combining WDM with Inline TDM and a Layer Peeling Algorithm

In order to limit the number of lead fibers it is desirable to maximize the number of sensors that can be multiplexed on a pair of down lead and up lead fibers. As described in previous sections, this is achieved by combining time division multiplexing (TDM) within each station with wavelength division multiplexing (WDM) between stations. For example, with 5 sensors per station (reference, 3 accelerometers and hydrophone) and N=20 wavelength channels the total number of sensors that can be interrogated through a pair of lead fibers becomes 5×20=100. However, the fact that the sensors within a sensor are arranged inline with multiple reflectors on the same fiber causes distortions in the detected TDM multiplexed interference signals. The effects of these distortions can be reduced by use of an inverse scattering algorithm, such as layer peeling.

Figure 9:
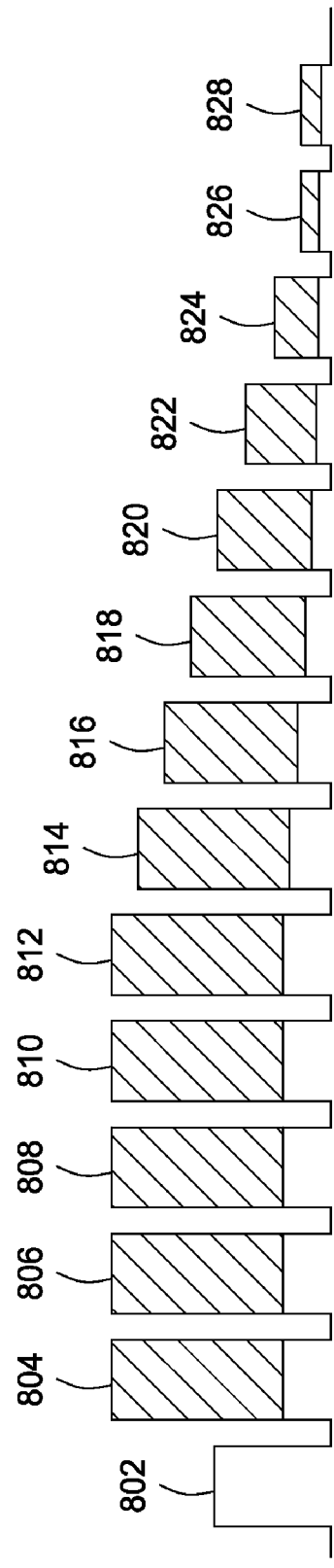
FIG. 9 illustrates exemplary reflected pulses from an array of reflectors separating sensors in a station cross-talk.

Multiple reflections may result in cross-talk between sensors within a station. FIG. 9 illustrates how the detected pulses comprise a composite of reflections from all the gratings along the sensor fiber of a sensor station. However, embodiments of the present invention may reduce cross-talk interference between sensors in an OBS sensor station by applying algorithms, for example, within the demodulation processing unit 564 located in the instrumentation unit 110 shown in FIG. 5.

For example, the host computer may be configured to apply an inverse scattering algorithm to detect an accurate transmission phase delay response between each pair of subsequent reflectors while reducing cross-talk from other reflectors within the array. One form of inverse scattering algorithm is the layer-peeling algorithm. This algorithm allows the use of gratings with higher reflectivity in a TDM system without creating unacceptable cross-talk, hence improving the power budget and in many cases allowing a system without the use of remote/remotely pumped amplifiers.

Signal processing software, for example, running in the host demodulation processing unit 564 may be used to process the light detection output from the detection circuitry 562 to eliminate cross-talk from higher order reflections in accordance with one embodiment of the present invention. Suitable layer-peeling algorithms are described in detail in the commonly owned U.S. patent application Ser. No. 10/649,588, entitled "METHOD AND APPARATUS FOR REDUCING CROSS-TALK INTERFERENCE IN AN INLINE FABRY-PEROT SENSOR ARRAY," herein incorporated by reference.

As the light pulses propagate through a sensor station they may experience coupling between the polarization propagation modes of the fiber. The influence of the multiple reflections on the detected interference signals will generally depend on this polarization mode coupling. In order to ensure accurate results from an inverse scattering algorithm, a polarization resolved measurements of the interference responses may therefore be required. Suitable methods for polarization resolved interrogation of the interference responses are described in detail in the previously mentioned U.S. patent application Ser. Nos. 10/649,588 and 11/056,970.

Grating Array Design

As previously described, the sensors within each station 142 may be formed by a series of gratings with overlapping reflection (channel) bands. Using multiple wavelength channels, multiple stations may be interrogated on a common sensor fiber utilizing wavelength division multiplexing, as illustrated in FIG. 6A, showing three adjacent wavelength channels. As illustrated, the interrogating laser frequency (wavelength) of channel N, $v_N$ ($\lambda_N$), may be controlled to be within the grating channel bandwidth $B_{ch}$, of grating N at all grating operating temperatures and all times, accounting for possible wavelength shifts in grating spectrum over time. For some embodiments, the gratings may be designed for wavelength channels selected such that at a nominal temperature (e.g., 4° C.), the wavelengths may range from approximately 1530 nm ($\lambda 1$) to approximately 1560 nm ($\lambda 20$), with a relatively constant frequency spacing, $\lambda v_{ch}$ (see FIG. 6A), between the wavelength channels, for example, 200 GHz.

For some embodiments, the channel bandwidth ($B_{ch}$) may be approximately 25% of the channel spacing (e.g., 50 GHz assuming a 200 GHz spacing). The reflectivity within the channel bandwidth may be equal or nearly equal to R (e.g., between 0.9 R and R as shown in FIG. 6A), where R can range, for example, from 1 to 10%.

The grating reflectivity of a particular grating within the other wavelength channel bands should be kept below a level R−x, for example, with x typically >40 dB to suppress demodulation errors and inter-station cross-talk due to multiple reflections between sensor stations along the same fiber.

As alluded to above, and as shown in FIG. 6B, the reflectivity for each grating (R1-R6) in a sensor station may be varied to optimize the signal-to-noise ratios for all sensors, and to reduce errors, including cross-talk, introduced by multiple reflections between gratings. As mentioned above, the unwanted effects caused by multiple reflections can generally be reduced by use of layer peeling, or other inverse scattering processing techniques. However, the accuracy of the output from the inverse scattering processing will generally be more accurate if the magnitudes of the errors that have to removed through such processing techniques are small. Hence, for some embodiments, reduction in errors/cross-talk due to multiple reflections can be achieved by letting the reflectivities of later gratings may be stronger than earlier gratings. For example, for some embodiments, the reflectivities for the six sensors may be as follows: $R_1$=4.0%, $R_2$=4.5%, $R_3$=5.0%, $R_4$=5.5%, $R_5$=6.0%, and $R_6$=6.5%.

Further, the (optical) distance, L, of fiber between the center position of (any) two gratings forming a sensor may for example be in the range from 4 to 20 meters. At nominal operating conditions, L should equal one half of the distance between the two optical pulses in one interrogating pulse pair, corresponding to the delay in the aforementioned compensating interferometer, CIF.

Band Wavelength Division Multiplexing (B-WDM)

While the array cable module 140 shown in FIG. 2 utilizes a single sensor fiber 146 for interrogating all sensor stations 142 (with corresponding wavelengths $\lambda 1$-$\lambda N$), for some embodiments, band wavelength division multiplexing (b-WDM) may be utilized to divide the wavelengths of a array cable module onto two (or more) sensor fibers. In other words, each sensor fiber may carry one band of wavelengths, and each sensor fiber may then be coupled to the sensor stations in the array cable module having corresponding wavelengths within the corresponding wavelength band.

The use of B-WDM in a connection node may minimize the variation in reflected power levels from the stations throughout an array cable module. In contrast, if all sensors are along a single fiber, there may be a substantial difference in loss seen by the first sensor in the series and the last sensor due to the distributed loss throughout the sensor array (each sensor station has some transmission loss).

Figure 7A:
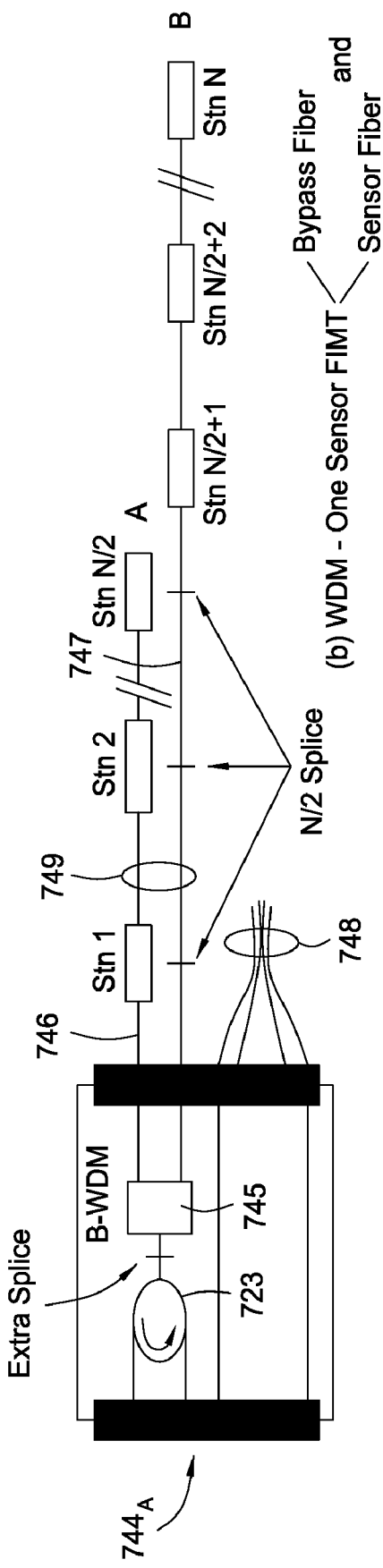
FIGS. 7A and 7B illustrate exemplary module connection nodes that utilize band wavelength division multiplexing (B-WDM), in accordance with embodiments of the present invention.
Figure 7B:
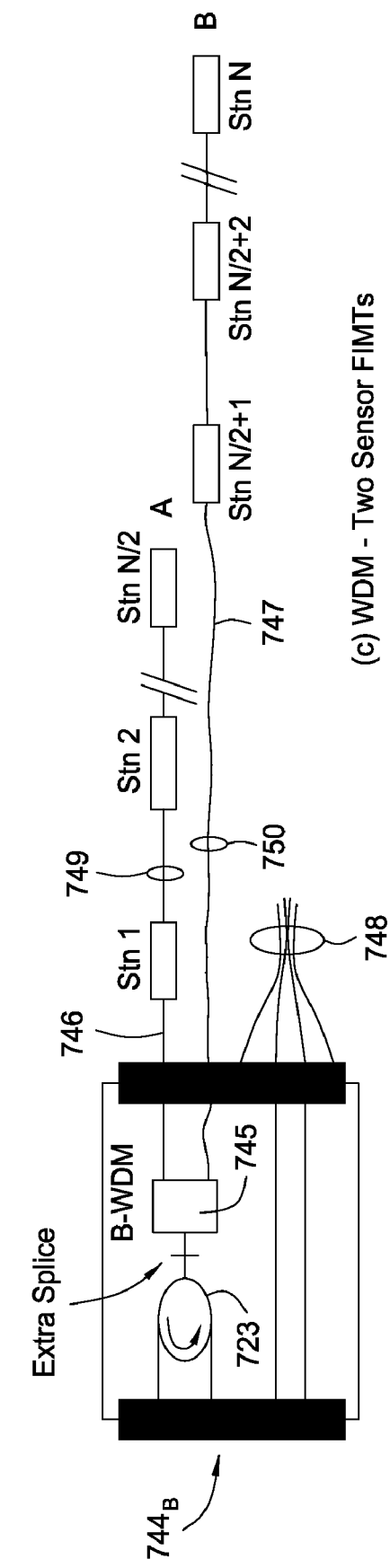

As illustrated in FIGS. 7A and 7B, for some embodiments, a module connection node 744 may include a band-WDM unit 745 downstream from a circulator 723 configured to divide wavelengths in an optical signal received from a circulator 723 into groups of wavelengths in different bandwidths. The groups of bandwidths may be carried on multiple sensor fibers, such as sensor fibers 746 and 747 shown in the figures. The band-WDM may be any suitable type component or components, such as a C-band red/blue splitter or a C/L-band splitter. For some embodiments, a C-Band (~1525-1565 nm) and L-band (~1570-1610 nm), may be used to approximately double the number of useable wavelengths compared to the use of a single band (e.g., a C-band only).

For some embodiments, the series of sensor stations 742 may be evenly distributed on the multiple fibers. For example, assuming an array cable module with N stations, N/2 sensor stations (e.g., 1 to N/2) may be interrogated with sensor fiber 746 and N/2 sensor stations (e.g., N/2+1 to N) may be interrogated with sensor fiber 747.

As illustrated, a multi-fiber tube, such as fiber in metal tube 748 may bypass each station eliminating the need for corresponding cutting and splicing at each station, while only a sensor fiber need be cut to splice into the sensor housing. As previously described, at a junction between array cable modules, the circulator 723 may couple a different fiber from the multi-fiber tube 748 to a sensor fiber leading into the B-WDM unit 745.

The multiple sensor fibers may also be housed in one or more tubes. As illustrated in FIG. 7A, multiple sensor fibers carrying different wavelength bands may also be housed in a single protective tube, such as a fiber in metal tube (FIMT) 749. If the FIMT 749 and both sensor fibers are cut in order to connect the appropriate sensor fiber to the sensors of the station, a splice 751 may be needed at each station, even for the sensor fiber that is not connected to the sensors of the station. As illustrated in FIG. 7B, however, for some embodiments, multiple FIMTs may be provided for the multiple sensor fibers. For example, as illustrated, each sensor fiber 746 and 747 may have its own FIMT 749 and 747, respectively.

OBS Station Interrogation from Two Ends

In applications, such as OBS, that involve substantial material, manufacturing and installation costs, it is often desirable to design in some degree of redundancy to allow continued interrogation of at least some sensors in the event of a failure. Examples of such failures include, but are not limited to, breakage (or other type damage) to a lead cable, damage to one or more fibers contained in a cable, or failure or cable breakage. In any case, some embodiments of the present invention provide sensor topologies with inherent redundancy that allow sensor stations to be interrogated from multiple directions.

In the present description, the term direction refers to the direction that interrogating (and reflected) pulses travel relative to interrogated sensor stations, in different modes of operation. In other words, in a first (e.g., normal) mode of operation, interrogating pulses may travel to a sensor station from one direction, while in a second (e.g., redundancy-enabled) mode of operation, interrogating pulses may travel to the sensor station from another direction.

Figure 10A:
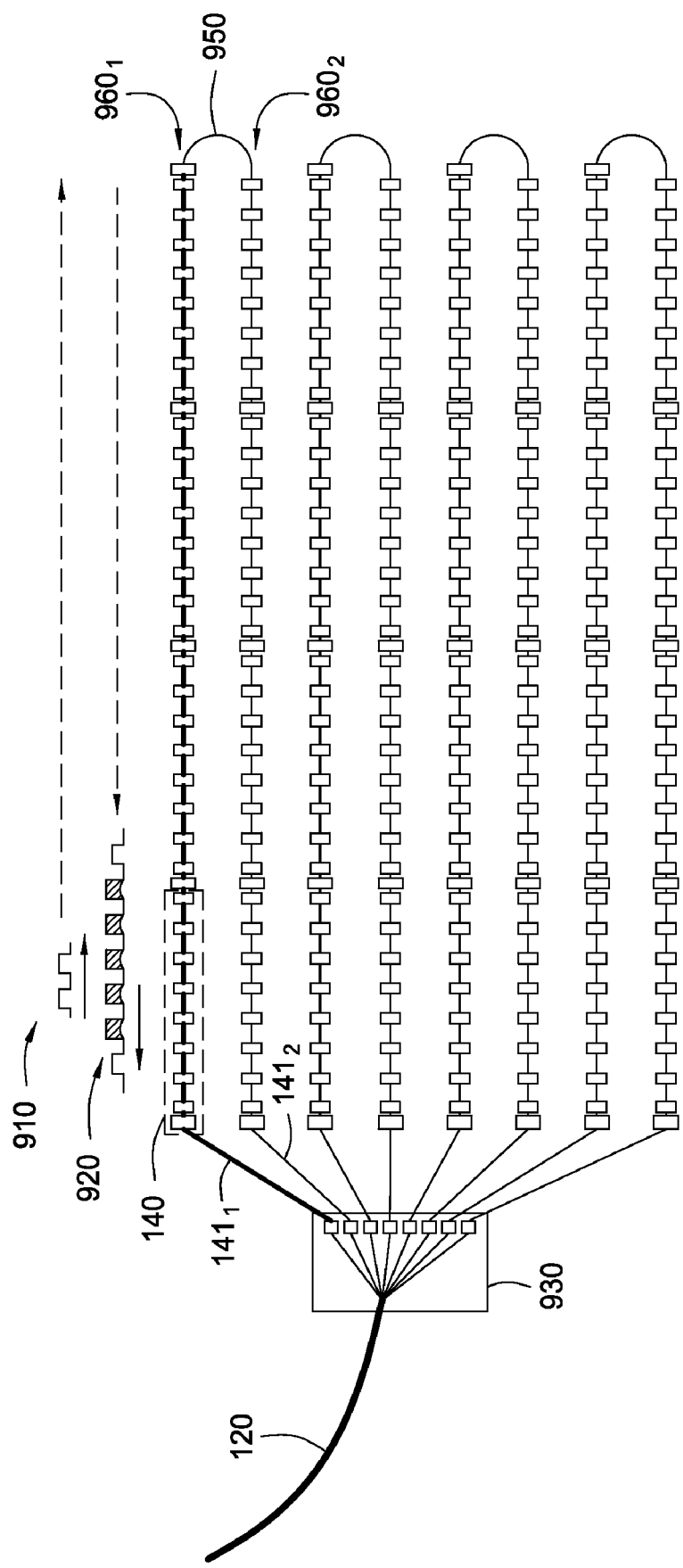
FIGS. 10A-10B illustrate an exemplary OBS sensing system topology allowing interrogation from two ends, in accordance with one embodiment of the present invention.
Figure 10B:
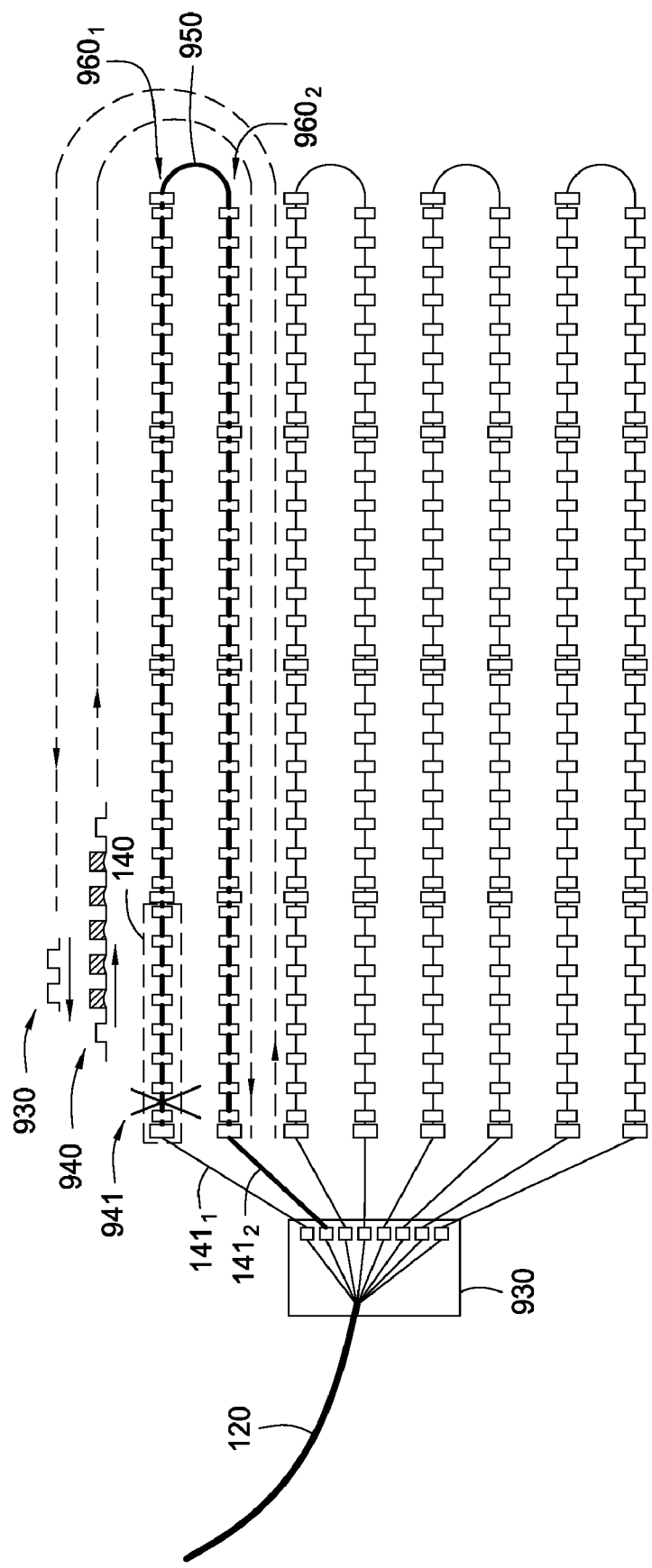

FIGS. 10A and 10B illustrate an exemplary OBS sensing system topology allowing interrogation from different directions before and after a break 941 in a lead cable (e.g., $141_1$) or an array cable module 140, in accordance with one embodiment of the present invention. The redundancy provided by the illustrated topology allows sensor stations 142 located both before and after the break 941 to be interrogated. The illustrated topology utilizes a connection 950 of cables 141 to interrogate different series 960 of array cable modules 140 extending from an array connection module 930.

In normal operation, all stations along series $960_1$ and $960_2$ (together these form an array cable) are interrogated via lead cable $141_1$. In this arrangement, the lead cable 120 may contain twice as many fibers as the lead cable in a system without redundancy (e.g., that shown in FIG. 1A). All fibers will normally be connected to the corresponding fibers in all the lead cables (i.e., $141_1$, $141_2$, etc.). To be able to interrogate sensors at both sides of one break 941, optical power may be coupled to one extra downlead fiber 122 from the instrumentation (e.g., by adding an extra 1×2 splitter) and one extra uplead fiber 124 may be interrogated at the receiver end by coupling this extra fiber to an extra WDM Demultiplexor 550. The number of detector circuits does not have to increase since the number of interrogated stations will be the same, but the connections from the WDM Demultiplexors 550 to the detector circuits may need to be rearranged to couple the reflected light from the different stations to the corresponding detector circuits.

As illustrated in FIG. 10A, in a first (e.g., normal) mode of operation, a first series $960_1$ of array cable modules 140 may be interrogated via a first lead cable $141_1$ extending from an array connection module 930. As described above, the lead cable $141_1$ may include multiple fibers, allowing N sensor stations 142 (e.g., with wavelengths $\lambda 1$-$\lambda N$) in a common array cable module 140 to be interrogated via a common sensor fiber 146. Connection nodes 144 may be used to couple a different fiber from the lead cable $141_1$ to the sensor fiber 146 of a subsequent array cable module 140. As will be described in greater detail below, with reference to FIGS. 12 and 13, different designs of connection nodes 144 may facilitate interrogation from multiple ends, with the exact components utilized depending on the particular embodiment.

Thus, as illustrated in FIG. 10B, in a second mode of operation (e.g., upon occurrence of an event, such as a break 941 in the lead cable $141_1$ or some other type of failure preventing interrogating pulses 910 or reflected interference pulses 920 from being transmitted to or from sensor stations 142 in the same or subsequent array cable modules 140), at least some of the sensor stations 142 in the series $960_1$ may be interrogated via a lead cable $141_2$ from the opposite direction. As illustrated, the connection 950 may allow interrogating pulses 930 carried in one or more fibers of a lead cable $141_2$ to reach sensor stations 142 in the series $960_2$ occurring after the break 941. The connection 950 may also allow reflected/interfering pulses 940 to be carried back to surface instrumentation via the lead cable $141_2$. In case of breakage in the lead cable 120, array connection module 930, or lead cables 141 ($141_1$, $141_2$, . . . , t, etc.) these components may have to be replaced.

Figure 11A:
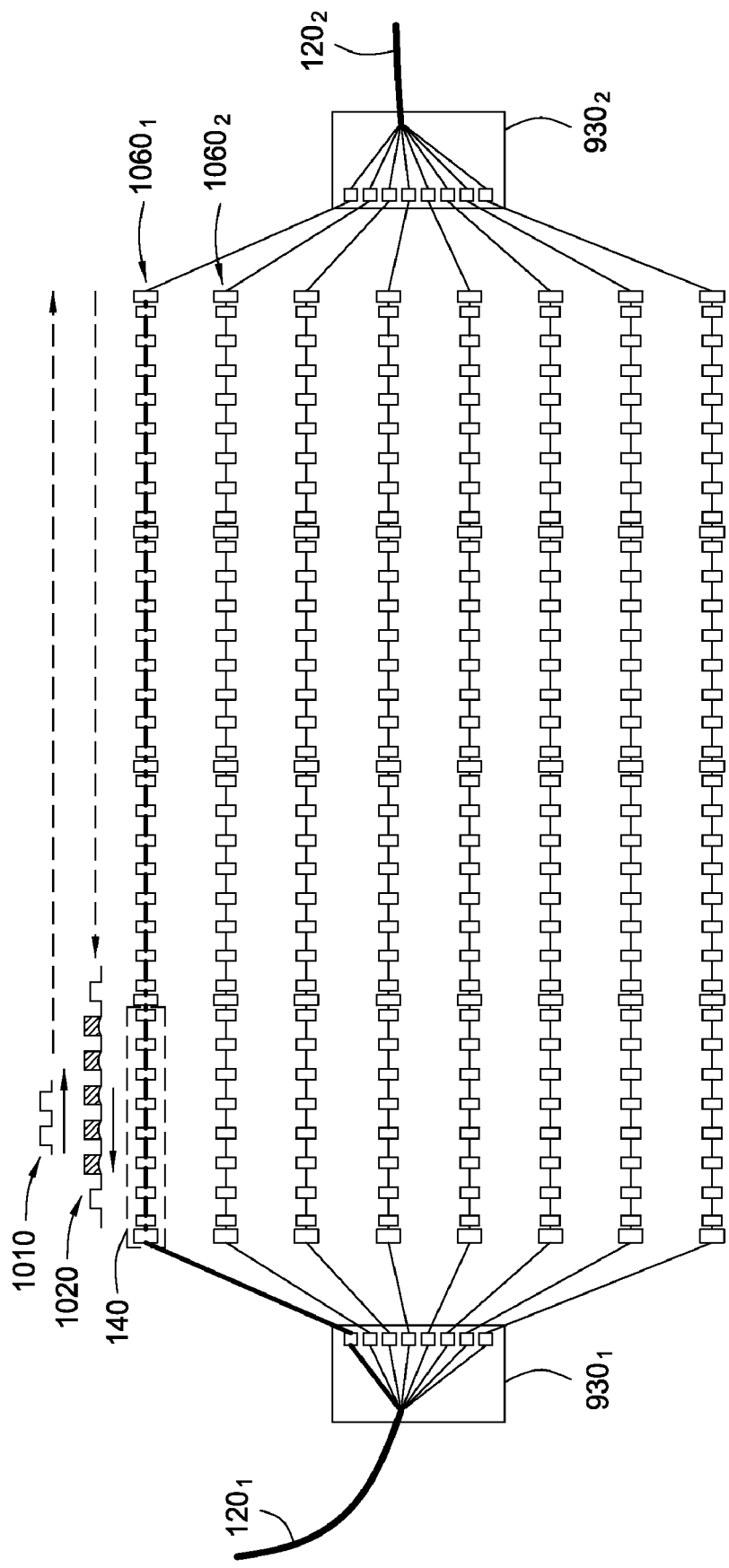
FIGS. 11A and 11B illustrates another exemplary OBS sensing system topology allowing interrogation from two ends, in accordance with one embodiment of the present invention.
Figure 11B:
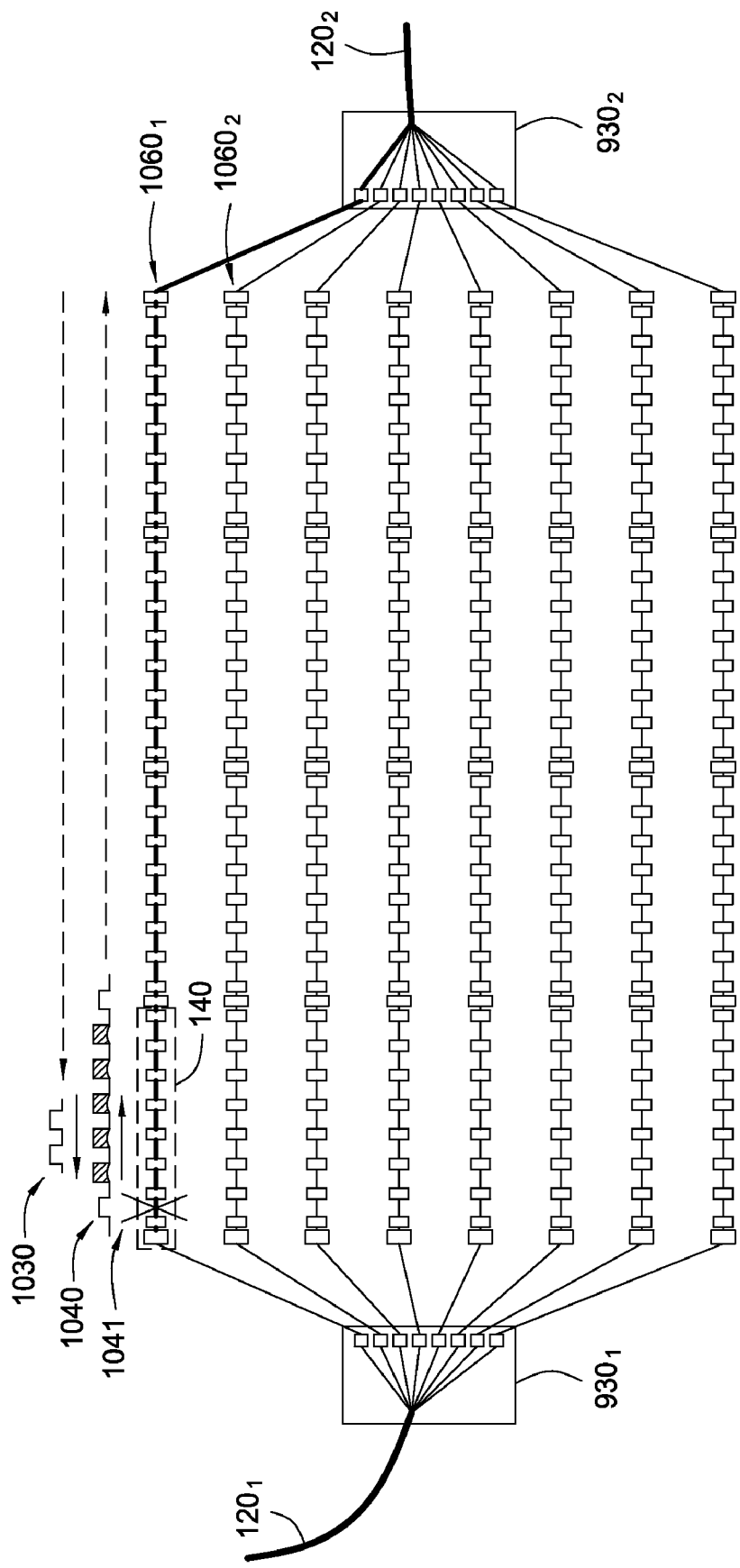

FIGS. 11A and 11B illustrate another exemplary OBS sensing system topology that allows interrogation from two ends, in accordance with one embodiment of the present invention. Rather than utilize a connection 950, as shown in the topology of FIGS. 10A-10B, the topology shown in FIGS. 11A and 11B utilize separate lead cables $120_1$ and $120_2$ and separate (or common) array connection modules $930_1$ and $930_2$. The lead cables will normally have the same number of fibers as the lead cable in a system without redundancy (cf. FIG. 1A). Otherwise, interrogation of sensor stations 142 in both directions may be carried out in a relatively similar manner. In normal operation, light will only be transmitted through the fibers in one of the lead cables (e.g., $120_1$).

As illustrated in FIG. 11A, before the occurrence of a failure, sensor stations 142 in a first array cable $1060_1$ of array cable modules 140 may be interrogated as described above, with the first lead cable $120_1$ used to carry interrogating pulse pairs 1010 and reflected pulses 1020. After a break 1041, as shown in FIG. 11B, the second lead cable $120_2$ may be used to interrogate sensor stations in the first array cable $1060_1$ in the other direction with pulse pairs 1030 and to carry reflected pulses 1040 back to the instrumentation.

A potential advantage of the topology shown in FIGS. 11A-11B over the topology shown in FIGS. 10A-10B is that the array cable covers a longer distance for the same number of array cable modules, since the array cables in FIGS. 10A-10B are folded.

As illustrated in FIGS. 11A and 11B, for some embodiments, the lead cables $120_1$ and $120_2$ may have separate corresponding array connection modules $930_1$ and $930_2$, respectively. For some embodiments, the array connection module $930_2$ may be installed during installation of the array cables 1060 ($1060_1$, $1060_2$, etc.), but without initially running the corresponding "redundant" lead cable $120_2$. By installing the array connection module $930_2$ in this manner, the lead cable $120_2$ may be deployed only if a cable or station failure is detected, thereby at least deferring cost, while still accommodating deployment of the lead cable $120_2$ and, thus, enabling redundant interrogation at a later time.

Exemplary Connection Nodes

While FIGS. 10A-10B and FIGS. 11A-11B illustrate different sensors topologies that allow for interrogation from two sides, FIGS. 12A-12B and FIGS. 13A-13B illustrate examples of different module connection nodes that may be used with either of the sensor topologies shown in FIGS. 10A-10B and FIGS. 11A-11B.

Figure 12A:
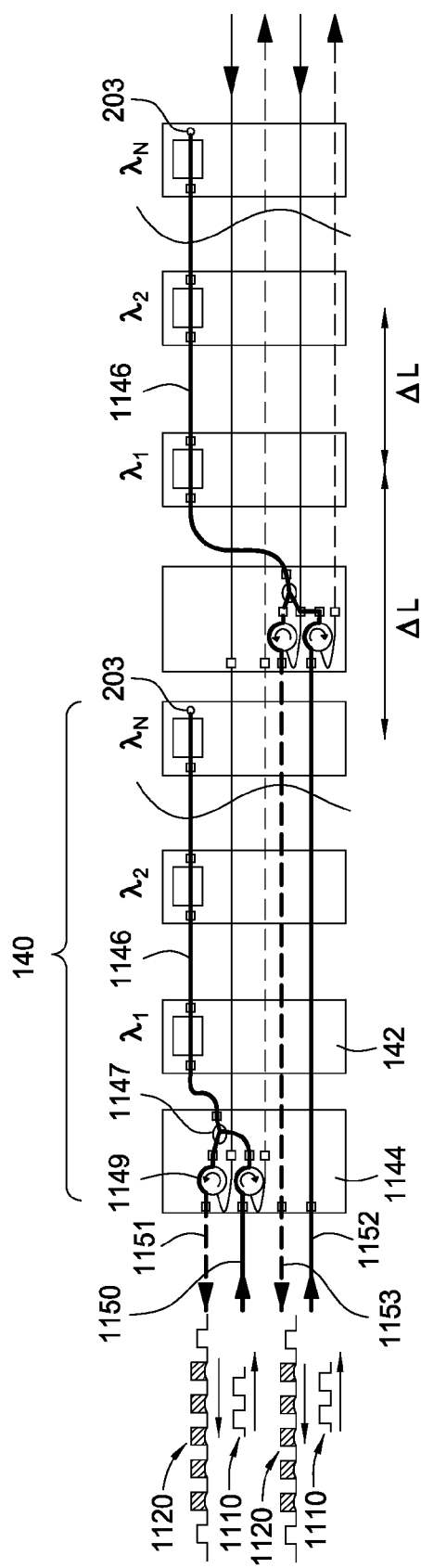
FIGS. 12A and 12B illustrate an exemplary sensor array cable module configuration being interrogated in first and second directions, respectively, in accordance with one embodiment of the present invention.
Figure 12B:
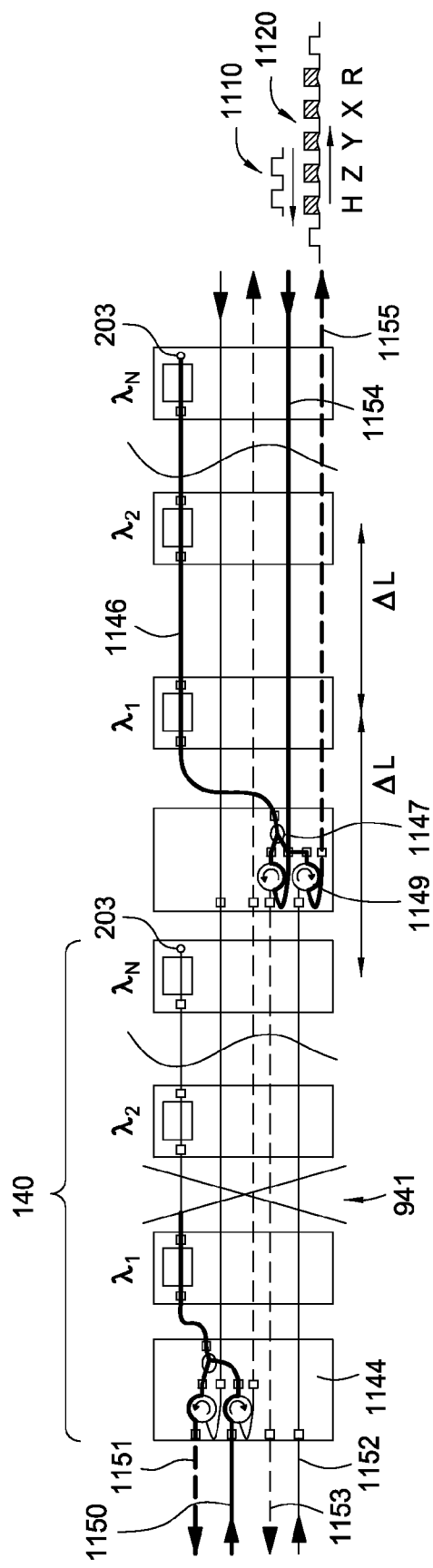

Referring first to FIGS. 12A and 12B, array cable modules 140 utilizing module connection nodes 1144 with a pair of circulators 1149 and a coupler 1147 are shown. As shown in FIG. 12A, "forward" interrogation may take place as described above, with pulse pairs 1110 used to interrogate sensor stations 142 in a first array cable module 140 carried in a first lead fiber 1150. The pulse pair 1110 is directed to a sensor fiber 1146 coupled to the sensor stations 142 through the bottom circulator 1149 and the coupler 1147. Reflected pulses 1120 are then carried from the sensor stations 142 through the coupler 1147 and the upper circulator 1149 to a return fiber 1151. The second array cable module 140 is interrogated in a similar manner, through another lead fiber 1152 and return fiber 1153.

Referring to FIG. 12B, however, after a cable break 941 occurs between stations in the first array cable module 140, "backside" interrogation from the other end of the series of array cable modules 140 may be enabled. Backside interrogation may be automatically enabled, for example, after automatically detecting a cable break 941 by the instrumentation, as indicated by a lack of reflected pulses from stations located after the break.

In any case, as illustrated in FIG. 12B, while sensor stations 142 located before the break (e.g., $\lambda 1$) are reachable in a conventional manner, sensor stations (e.g., $\lambda 2$-$\lambda N$) located after the break 941 are not reachable in this arrangement. However, sensor stations 142 in the subsequent array cable module 140, although located after the break 941 are reachable. For example, as illustrated interrogating pulse pairs 1110 on a lead fiber 1154 from the "backside" direction may be guided to a sensor fiber 1146 of the sensor stations 142 via the top coupler 1149 (in the module connection node 1144 of the array cable module). Resulting reflected pulses 1120 are then carried from the sensor stations 142 through the coupler 1147 and the bottom circulator 1149 to a return fiber 1155.

An advantage of the arrangement is that, even when interrogation occurs from the "backside" direction, as shown in FIG. 12B, the sensors within the station 142 are still interrogated in the normal order. For example, as shown by the reflected pulses 1120 carried on the lead fiber 1155, the reference interferometer (R) may still be interrogated first, followed by X, Y, and Z accelerometers and finally the hydrophone (H). Interrogating the reference first may be advantageous because it will not suffer from cross-talk from the other sensors in the station. It should be noted, however, that some amount of optical loss occurs with each path taken through the couplers 1147.

Figure 13A:
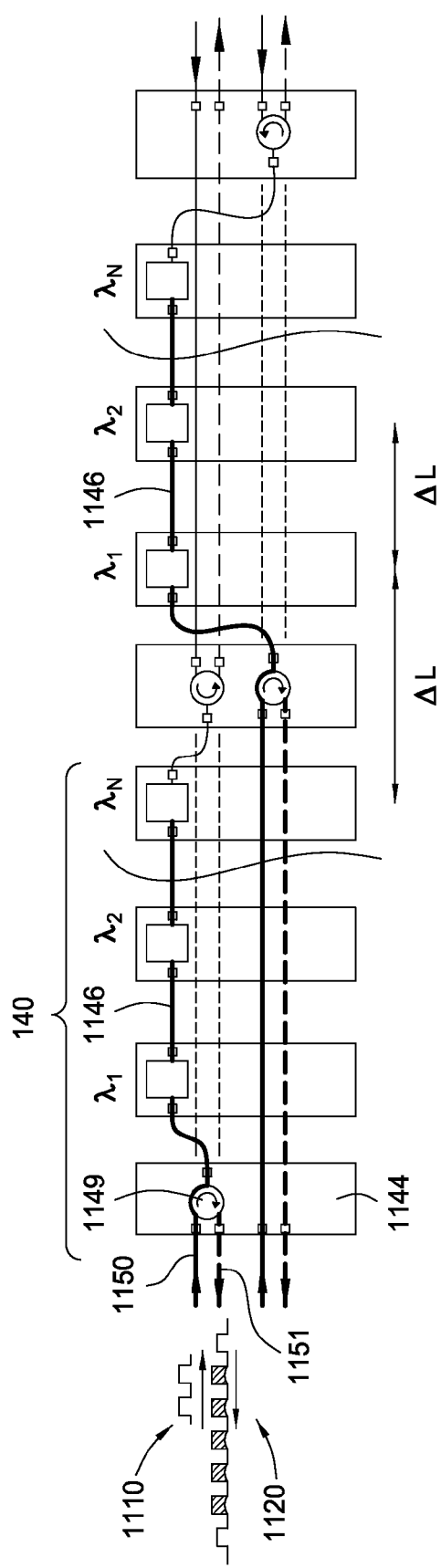
FIGS. 13A and 13B illustrate another exemplary sensor array cable module configuration being interrogated in first and second directions, respectively, in accordance with one embodiment of the present invention.
Figure 13B:
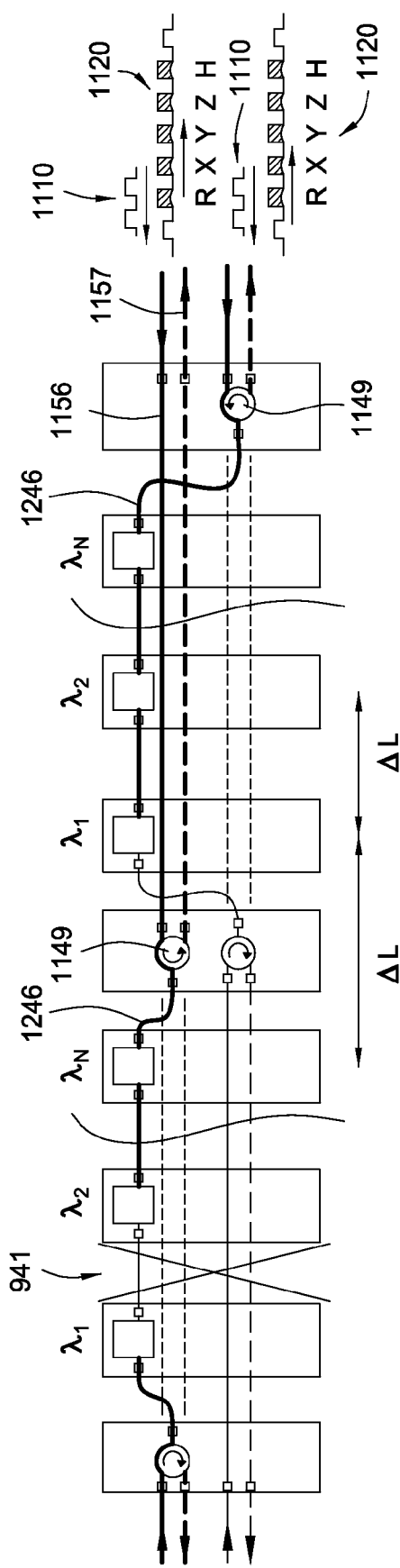

FIGS. 13A and 13B illustrate another exemplary configuration of array cable modules that allows for bidirectional interrogation in accordance with another embodiment of the present invention. In the illustrated arrangement, array cable modules 140 utilizing module connection nodes 1144 with circulators 1149 only, without couplers, are shown. As shown in FIG. 13A, "forward" interrogation may take place as described above, with pulse pairs 1110 used to interrogate sensor stations 142 in a first array cable module 140 carried in a first lead fiber 1150 to a sensor fiber 1146 via a circulator 1149, which also directs resulting reflected pulses 1120 to a return fiber 1151.

Referring to FIG. 13B, however, after a cable break 941 occurs between stations 142 in the first array cable module 140, backside interrogation from the other end may be enabled. As in the previous arrangement shown in FIGS. 12A and 12B, the first station ($\lambda 1$) located before the break 941 is reachable in the forward direction, while the remaining sensor stations ($\lambda 2$-$\lambda N$) in the same array cable module 140 are not. However, in the arrangement shown in FIGS. 13A and 13B, these remaining sensor stations, although located after the break 941, may be reachable in the backside direction.

As illustrated, for some embodiments, when interrogating in the "opposite" direction, a connection node 1144 in one array cable module 140 may be used to couple lead and/or return fibers (1156 and 1157) to a sensor fiber 1246, via a circulator 1149. In this manner, interrogating pulses 1110 from the backside may be used to interrogate these sensor stations ($\lambda 2$-$\lambda N$) occurring after the break 941 in another array cable module 140 by guiding light from the backside lead fiber 1156 to a sensor fiber 1246 via a circulator 1247. Reflected pulses 1120 may be directed back onto the return fiber 1157.

This technique does have an advantage in that sensor stations 140 located after a break 941 may still be interrogated. However, the accuracy of measurements obtained from the reflected/interfering pulses 1120 may be reduced somewhat (relative to measurements obtained via interrogation in the first direction), in part due to fact that the sensor stations are being interrogated in the wrong direction. For example, as shown by the reflected pulses 1340, the sensors, in order, as seen during backside interrogation: hydrophone (H), Z, Y, and X accelerometers, and finally the reference interferometer (R).

By interrogating the reference interferometer last, the reference reading may be affected by cross-talk from the hydrophone, which may reduce resolution. However, depending on the application, the reduced resolution may be acceptable, particularly given the ability to interrogate sensors located after a cable break. Further, for some embodiments, a second reference interferometer (not shown) may be included and positioned such that it occurs earlier (first) in the optical path when a sensor station is interrogated from the backside.

CONCLUSION

Features and aspects of any of the embodiments described herein can be combined or otherwise modified with any features or aspects of other embodiments described herein. While the foregoing is directed to embodiments of the present invention, other and further embodiments of the invention may be devised without departing from the basic scope thereof, and the scope thereof is determined by the claims that follow.

What is claimed is:

1. An array of ocean bottom seismic sensor stations, comprising:
   at least one array connection module;
   a plurality of array cables extending from the array connection module, each array cable including a series of array cable modules and a multi-fiber lead cable, each array cable module including a series of seismic sensor stations suitable for deployment at or below the ocean bottom floor and connected by multi-fiber lead cables, each station housing a plurality of optical sensors, all stations within the same array cable module sharing a common sensor fiber;
   for each array cable module, a module connection node to couple a different one or more fibers of the lead cable to a sensor fiber used to interrogate a series of corresponding seismic sensor stations; and
   wherein the sensors within each station are formed by a series of gratings with overlapping wavelength reflection bands, each corresponding to a range of wavelengths.

2. The array of claim 1, wherein the reflectivity of later gratings is stronger than earlier gratings.

3. The array of claim 1, wherein the optical distance of fiber between the center position of two gratings forming a sensor is in the range of 4 to 20 meters.

4. The array of claim 1, wherein the optical distance of fiber between the center position of two gratings forming a sensor is equal to one half the distance between the two optical pulses in one interrogating pulse pair.

5. The array of claim 1, wherein the reflectivity within the wavelength range of the wavelength reflection bands is between .9 R and R, where R ranges from 1 to 10 percent.

6. The array of claim 5, wherein the grating reflectivity of a particular grating within the wavelength range of other wavelength reflection bands is below a level R–x, with x above approximately 40 dB, to suppress demodulation errors and inter-station cross-talk.

7. The array of claim 1, wherein the gratings are designed for wavelength reflection bands selected such that at a nominal temperature, the corresponding wavelength range is from approximately 1530 nm to approximately 1560 nm.

8. The array of claim 1, wherein the gratings are designed with a relatively constant frequency spacing between the wavelength reflection bands.

9. The array of claim 1, wherein the bandwidth of a wavelength reflection band is approximately 25 percent of the spacing between the wavelength reflection bands.

10. A sensing system, comprising:
    at least one array connection module;
    a plurality of array cables extending from the array connection module, each array cable including a series of array cable modules and a multi-fiber lead cable, each array cable module including one or more series of sensor stations connected by multi-fiber lead cables, each station housing a plurality of optical sensors sharing a common wavelength, the common wavelength being different for each station in a same series, all stations within the same array cable module sharing a common sensor fiber, the sensors within each station being formed by a series of gratings with overlapping wavelength reflection bands;
    for each array cable module, a module connection node to couple a different one or more fibers of the lead cable to a sensor fiber used to interrogate a series of corresponding seismic sensor stations; and instrumentation coupled to the series of sensor stations and configured to interrogate sensors housed in each station using time division multiplexing and to interrogate sensors housed in different sensor stations in each series using wavelength division multiplexing.

11. The system of claim 10, wherein the reflectivity of later gratings may be stronger than earlier gratings.

12. The system of claim 10, wherein the instrumentation is configured to use an inverse scattering processing technique.

13. The system of claim 12 wherein the inverse scattering technique is a layer peeling technique.

14. An array of seismic sensor stations, comprising:
at least one array connection module;
a plurality of array cables extending from the array connection module, each array cable including a series of array cable modules and a multi-fiber lead cable, each array cable module including a series of seismic sensor stations connected by multi-fiber lead cables, each station housing a plurality of optical sensors, all stations within the same array cable module sharing a common sensor fiber;
for each array cable module, a module connection node to couple a different one or more of fibers of the lead cable to a sensor fiber used to interrogate a series of corresponding seismic sensor stations; and
the sensors within each station are formed by a series of gratings where the reflectivity of later gratings is stronger than earlier gratings.

15. The array of claim 14 wherein the sensors within each station are formed by a series of gratings with overlapping wavelength reflection bands corresponding to a wavelength range.

16. The array of claim 14, wherein the reflectivity within the wavelength range of the wavelength reflections bands is between .9 R and R, where R ranges from 1 to 10 percent.

17. The array of claim 14, wherein the grating reflectivity of a particular grating within the wavelength ranges of other wavelength reflections bands is below a level R−x, with x above approximately 40 dB, to suppress demodulation errors and inter-station cross-talk.

18. The array of claim 14, wherein the optical distance of fiber between the center position of two gratings forming a sensor is in the range of 4 to 20 meters.

19. The array of claim 14, wherein the optical distance of fiber between the center position of two gratings forming a sensor is equal to one half the distance between the two optical pulses in one interrogating pulse pair.

20. The array of claim 14, wherein the gratings are designed for wavelength reflection bands selected such that at a nominal temperature, the wavelength range is from approximately 1530 nm to approximately 1560 nm.

21. The array of claim 14, wherein the gratings are designed with a relatively constant frequency spacing between the wavelength reflection bands.

22. The array of claim 14, wherein the bandwidth of a wavelength reflection band is approximately 25 percent of the spacing between the wavelength reflection bands.

* * * * *

UNITED STATES PATENT AND TRADEMARK OFFICE
CERTIFICATE OF CORRECTION

| | | |
|---|---|---|
| PATENT NO. | : 7,539,080 B2 | Page 1 of 1 |
| APPLICATION NO. | : 11/932246 | |
| DATED | : May 26, 2009 | |
| INVENTOR(S) | : Ronnekleiv et al. | |

It is certified that error appears in the above-identified patent and that said Letters Patent is hereby corrected as shown below:

In the Claims:

Column 20, Claim 16, Line 5, please delete "14" and insert --15-- therefor;

Column 20, Claim 17, Line 8, please delete "14" and insert --16-- therefor.

Signed and Sealed this

Fourth Day of August, 2009

JOHN DOLL
*Acting Director of the United States Patent and Trademark Office*